(12) United States Patent
Sapp et al.

(10) Patent No.: US 12,366,664 B2
(45) Date of Patent: Jul. 22, 2025

(54) INTELLIGENT AND DYNAMIC GATEWAY

(71) Applicant: Tribalco LLC, Bethesda, MD (US)

(72) Inventors: Jeffrey K. Sapp, Tallapoosa, GA (US); Jason B. Sapp, Carrollton, GA (US)

(73) Assignee: Tribalco LLC, Bethesda, MD (US)

( * ) Notice: Subject to any disclaimer, the term of this patent is extended or adjusted under 35 U.S.C. 154(b) by 328 days.

(21) Appl. No.: 17/816,032

(22) Filed: Jul. 29, 2022

(65) Prior Publication Data

US 2023/0341559 A1 Oct. 26, 2023

Related U.S. Application Data

(60) Provisional application No. 63/273,064, filed on Oct. 28, 2021, provisional application No. 63/227,705, filed on Jul. 30, 2021.

(51) Int. Cl.
| | |
|---|---|
| *G01S 19/36* | (2010.01) |
| *G01S 19/01* | (2010.01) |
| *G01S 19/25* | (2010.01) |
| *G01S 19/32* | (2010.01) |
| *G04R 20/02* | (2013.01) |
| *H04B 1/00* | (2006.01) |
| *H04W 88/16* | (2009.01) |

(52) U.S. Cl.
CPC .......... *G01S 19/015* (2013.01); *G01S 19/256* (2013.01); *G04R 20/02* (2013.01); *H04B 1/0003* (2013.01); *H04W 88/16* (2013.01)

(58) Field of Classification Search
None
See application file for complete search history.

(56) References Cited

U.S. PATENT DOCUMENTS

| | | |
|---|---|---|
| 6,212,550 B1 | 4/2001 | Segur |
| 6,735,630 B1 | 5/2004 | Gelvin |
| 7,779,449 B2 | 8/2010 | Pham |
| 8,711,837 B1 | 4/2014 | Sapp et al. |

(Continued)

FOREIGN PATENT DOCUMENTS

GB 2405062 A 2/2005

OTHER PUBLICATIONS

Tech Guide for Communications Interoperability, "A Guide for Interagency Communications Projects," U.S. Department of Justice Office of Community Oriented Policing Services. 2006.

(Continued)

*Primary Examiner* — Gary Lafontant
(74) *Attorney, Agent, or Firm* — Meunier Carlin & Curfman LLC

(57) ABSTRACT

The present disclosure describes systems and methods for secure communication over multiple secure paths through an intelligent and dynamic gateway capable of receiving and processing communications received from multiple paths, protocols, physical spectrums, or sources and processing such inputs using software (e.g., middleware or one or more virtual machines (VMs)) to generate wide area network (WAN) output that can, in turn, be transmitted to multiple paths, irrespective of protocol, physical spectrum, or destinations. As such, the current gateway can be configured to be agnostic to the nature of input or output technologies and manage the conversion of data for ubiquitous telecommunications management.

20 Claims, 23 Drawing Sheets

(56) References Cited

U.S. PATENT DOCUMENTS

| | | |
|---|---|---|
| 8,842,663 B2 | 9/2014 | Brothers |
| 10,931,480 B1 | 2/2021 | Waldersen |
| 2007/0060144 A1 | 3/2007 | Mills |
| 2009/0310531 A1 | 12/2009 | Kuehl |
| 2011/0039503 A1* | 2/2011 | Hu .................. H04B 1/0003 455/74 |
| 2011/0103393 A1 | 5/2011 | Meier et al. |
| 2011/0252161 A1 | 10/2011 | Ranney |
| 2020/0344292 A1* | 10/2020 | Todd .................. H04L 65/80 |
| 2021/0041576 A1* | 2/2021 | Jackson .............. G01S 19/32 |

OTHER PUBLICATIONS

H.S. Kenyon, "Wireless Gateway to Connect Warfighters," Signal, Nov. 2009.

International Search Report and Written Opinion of the International Searching Authority in PCT/US22/38831, mailed Feb. 22, 2023.

\* cited by examiner

DATA IN USE - HOMOMORPHIC ENCRYPTION

INTELLIGENT AND DYNAMIC GATEWAY

CROSS-REFERENCE TO RELATED APPLICATIONS

This application claims priority to U.S. Provisional Application No. 63/227,705, filed Jul. 30, 2021, entitled "INTELLIGENT AND DYNAMIC GATEWAY" and to U.S. Provisional Application No. 63/273,064, filed Oct. 28, 2021, entitled "INTELLIGENT AND DYNAMIC GATEWAY," each of which is incorporated herein by reference in its entirety.

BACKGROUND

Gateway devices have been used in telecommunications for decades. One problem with many available gateways is a lack of flexibility in that they can be limited to using one set of protocols, such as internet protocols (IP), or proprietary protocols, such as those for programable radios used in law enforcement or military applications.

SUMMARY

The present disclosure describes systems and methods for secure communication over multiple secure paths through an intelligent and dynamic gateway capable of receiving and processing communications received from multiple paths, protocols, physical spectrums, or sources and processing such inputs using software (e.g., middleware or one or more virtual machines (VMs)) to generate wide area network (WAN) output that can, in turn, be transmitted to multiple paths, protocols, physical spectrums, or destinations. This is loosely known as an any-to-any capability, although the use of "any" is colloquial in that the goal is to be able to receive, process, and send data, practically, and there may be current or future data paths impractical for processing through the present gateway.

The present gateway then works in combination with other disclosed components to perform the following selected or optional functions: a) secure and intelligent routing of data through algorithmic dissection and subsequent dissemination over one or more paths using one or more communication protocols or radio-frequency (RF) bands in a manner that avoids detection or interception, b) multicast distribution of data over one or more such paths using dedicated UDP port assignments, device registration, or other techniques allowing the gateway to recognize and address devices seeking to communicate with the gateway, c) a software defined radio (SDR) capable of establishing and providing cellular or other wireless service in, for example, areas in which service has been disrupted, in which the SDR can be in a fixed location or mobile, including being affixed to a vehicle or configured for a human to carry; d) self-healing network management through ad-hoc peer-to-peer communication or other disclosed techniques, e) block chain encryption for symmetric or asymmetric key-based encryption of data communicated over such paths; f) block chain based communication using a multi-party protocol (MPP), a constellation protocol that uses multiparty computation (MPC), sharing consensus between n parties in a constellation, obviating central authorization, signature, or trust; optical transmission of data over one or more such paths using one or more lasers configured for secure and intelligent data transmission, g) synchronization management using a failsafe system atomic clock for instances in which GPS or other synchronization becomes unavailable for communication over such paths.

The present gateway solves problems in conventional systems by using configurable hardware and software that allow the gateway to receive audio, video, control or other data streams from many different sources, protocols, physical spectrums, or communications technologies, extract a payload, and convert the payload to one or more formats for outgoing wide area network (WAN) output to a wide array of destinations, protocols, physical spectrums, or communications technologies. The gateway can also be configured with an array of encryption technologies, software defined radios, transmission obfuscation techniques, self-healing techniques, block chain-based security (using, e.g., a multi-party protocol), or failsafe synchronization technologies that provide precise position, navigation, and/or timing (PNT) information in the absence of GPS or other common sources of such information.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other.

DETAILED DESCRIPTION

The system architecture described herein includes an intelligent and dynamic communications gateway that enables and facilitates "any-to-any" communication, as defined above, meaning that the gateway receives communications from various paths, allowing communication between devices on different networks, the networks themselves potentially using different protocols, different radio frequency (RF) bands, different spectrums, or different types of physical layer communication technologies altogether (e.g., TCP/IP, SIPR, NIPR, 3G, 4G, 4G LTE, 5G, wireless RF, high frequency (HF), very low frequency (VLF), very high frequency (VHF), ultra-high frequency (UHF), serial, Ethernet, fiberoptic, optical laser, etc.). The gateway receives communications from such various input paths, protocols, physical spectrums, or sources and processes such inputs using software, including potentially middleware or one or more virtual machines (VMs), or other suitable software that will be familiar to one skilled in the art, to generate wide area network (WAN) output that can, in turn, be transmitted over one or multiple paths, protocols, physical spectrums, or destinations. The gateway can thus be agnostic to the input and output network configurations and protocols and dynamically process "any" input that the middleware has been configured and set up to handle. This obviates the common problem in which one manufacturer's device cannot speak with another manufacturer's device, as the present gateway can act as an intermediary and translate or transcode the output to accommodate the receiving device's requirements. The software/middleware can analyze, detect, or accept the data payload from any available input source communication and convert the payload to a format that can be transmitted as WAN output to one or more of the destination paths described herein or otherwise available. As such, the gateway can receive input from, for example, a TCP/IP source and convert the payload to, for example, a Secure Internet Protocol Router/Non-Secure Internet Protocol Router (SIPR/NIPR) format for output over a path using that protocol to the desired destination device(s).

Figure 1:
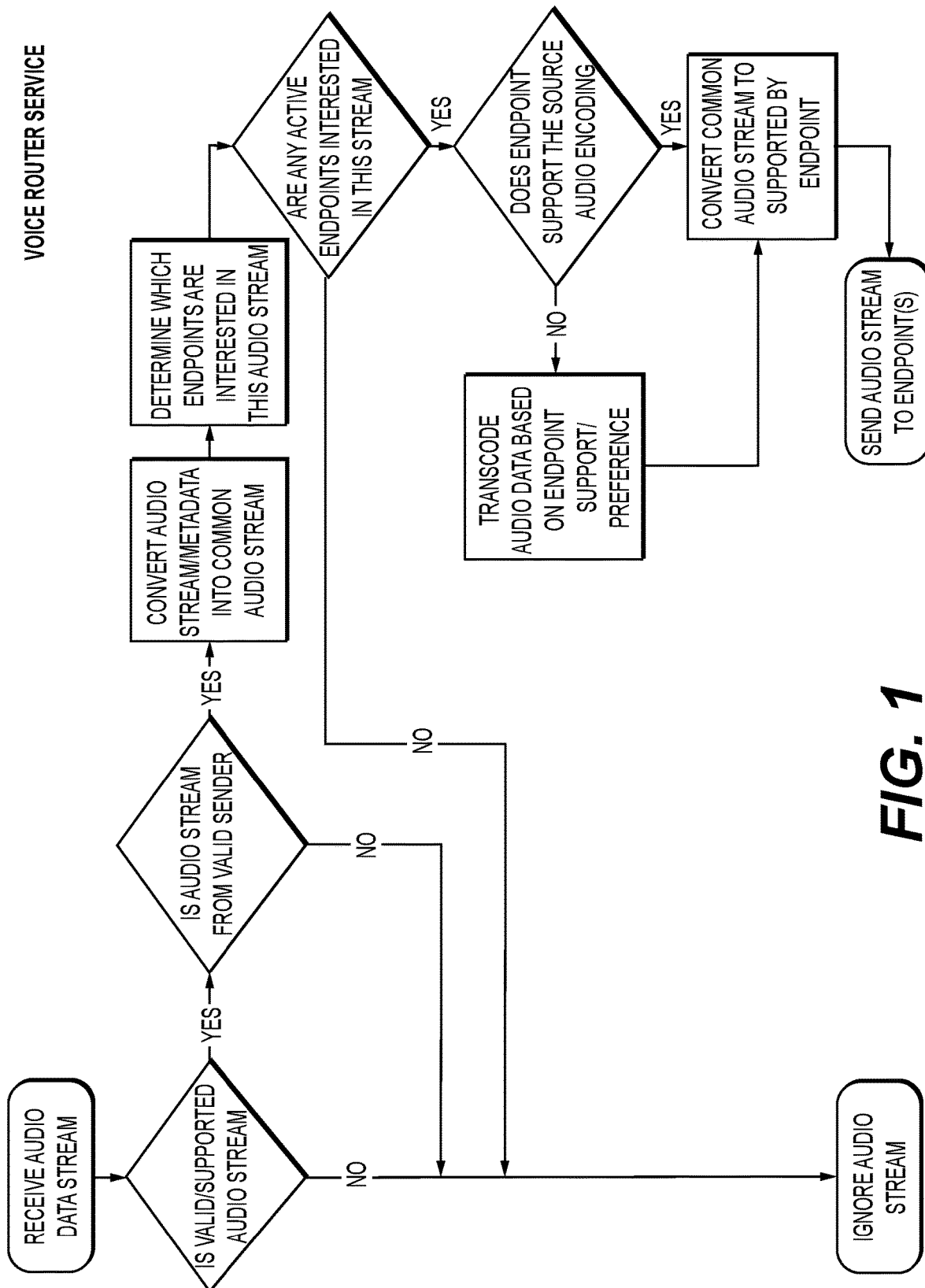
FIG. 1 depicts a sample logic flow diagram for software/middleware in the present gateway that routes voice data received in the gateway.
Figure 2A:
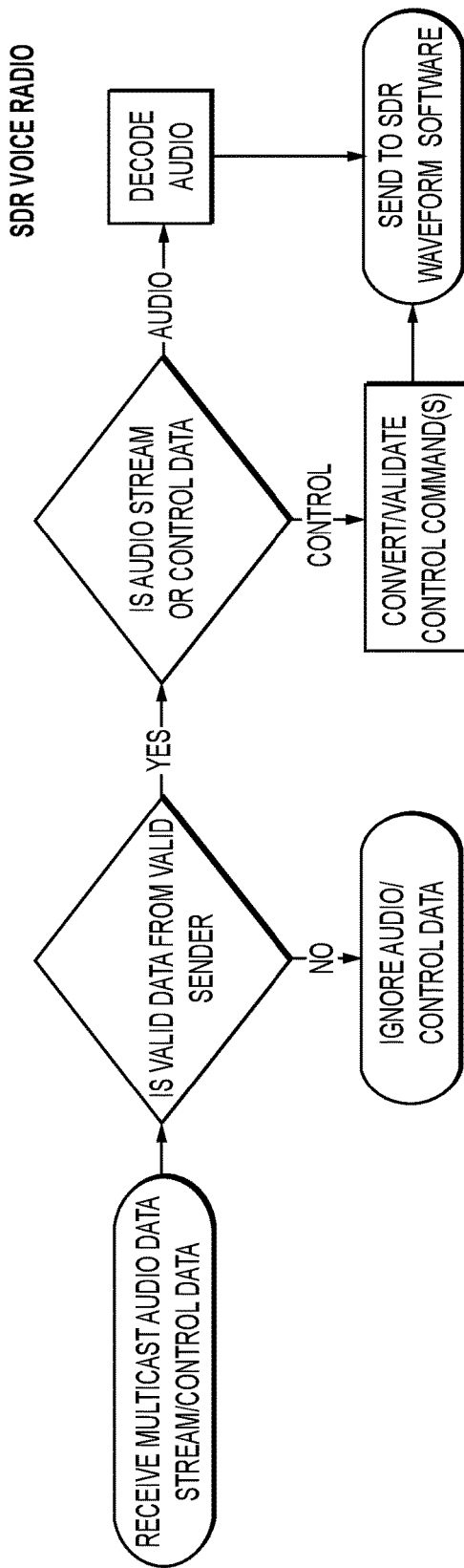
FIGS. 2A and 2B depict a sample logic flow diagram for an SDR voice radio with which the present gateway can be combined, as discussed herein.
Figure 2B:
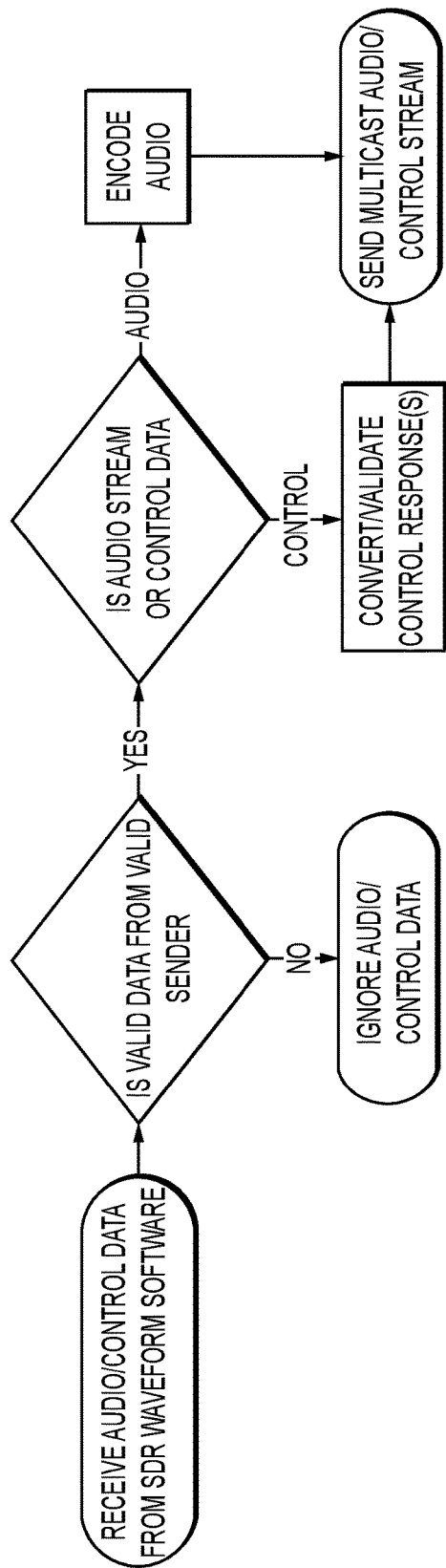
Figure 3:
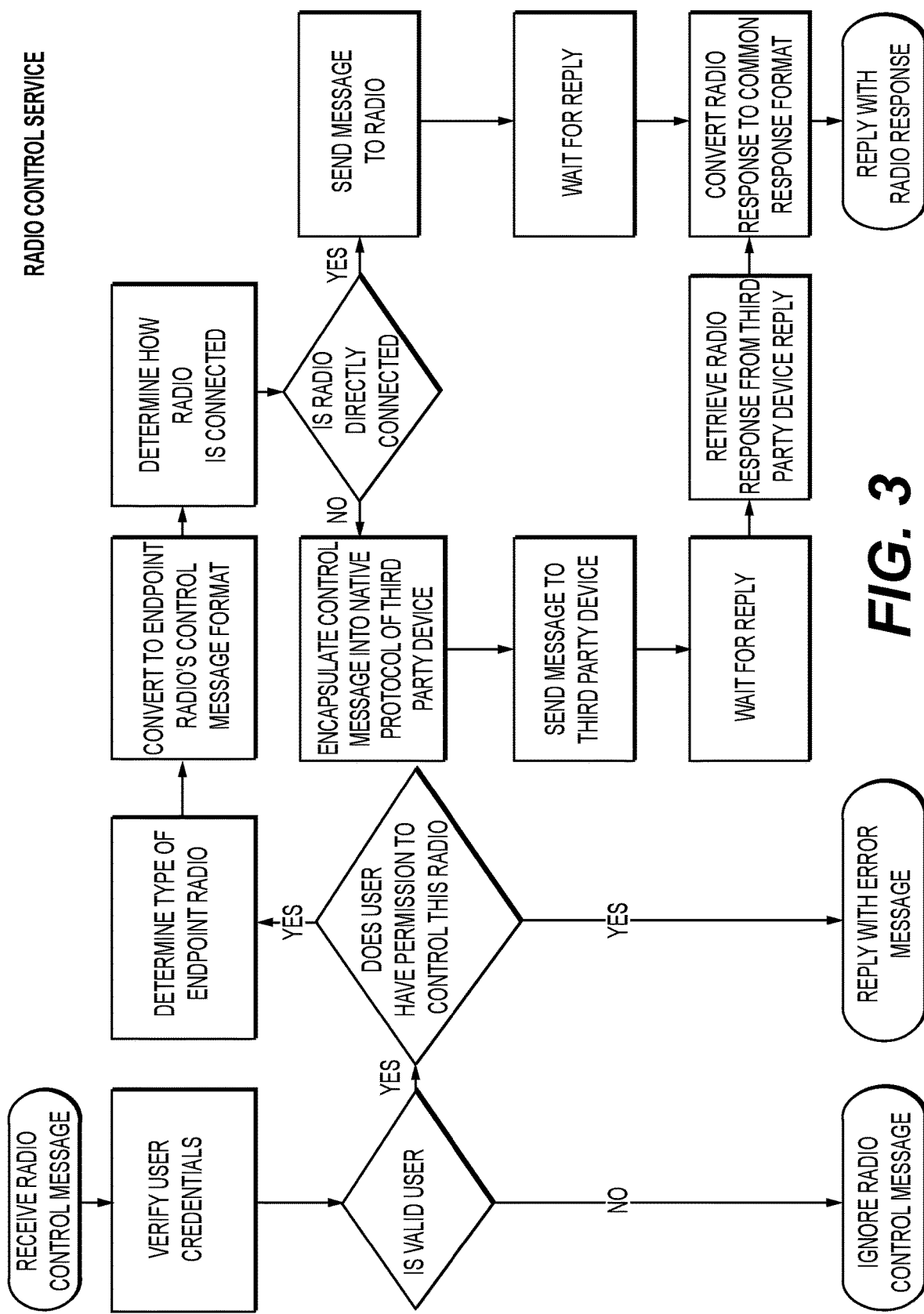
FIG. 3 depicts a sample logic flow diagram for control over an SDR radio with which the present gateway can be combined, as discussed herein.

The gateway software/middleware, as illustrated in the logic flow diagrams in FIGS. 1-3, can be configured to monitor available input and output paths, such as all paths then active or available, such that the gateway and its user(s) or administrator(s) intelligently determine which output path(s) to use and how much of the payload to send over one or more such available output paths. In one embodiment discussed herein, the gateway may send, as WAN output, a portion of a payload over one RF band and a second portion over a second RF band (e.g., according to a PACE (Primary, Alternate, Contingency, and Emergency) Plan file stored on an SDR server, switching impacts throughput) so as to minimize or avoid detection by a third party seeking to listen to or intercept the payload at issue, such as a listener using a spectrum analyzer, packet sniffer, or other device or process that can detect data bursts or other deviations from a baseline amount of spectral energy. The gateway can thus obfuscate outgoing communications for applications in which obfuscation is beneficial, such as military communications or other scenarios in which security and secrecy are desired and detection or interception are to be minimized or avoided altogether. The gateway can optimize such secure communication over n number of paths, where n reflects the number of available output paths at any given time or in any given configuration. One way of accomplishing this efficiently is for the software/middleware to be associated with a table, database, or other data structure that maintains a record of available paths, potentially updating that record constantly, episodically, periodically, or as otherwise needed to meet the demands of the objectives to be met, as the gateway has been configured.

In one example embodiment, as illustrated in the logic flow diagram in FIGS. 1-3, the radios or other communications devices associated with networks to which the gateway is connected can each be assigned a different UDP port such that the gateway can direct a communication to a particular destination device, such as a radio, phone, computer etc. In this example, the gateway can be configured to address one device (unicast), multiple available devices (multicast), all available devices (broadcast), or otherwise. One example of such addressing is to send as WAN output a datastream with a header structure that includes assigned UDP port numbers for destination devices intended for a particular communication. FIG. 1-3, discussed herein.

Figure 4:
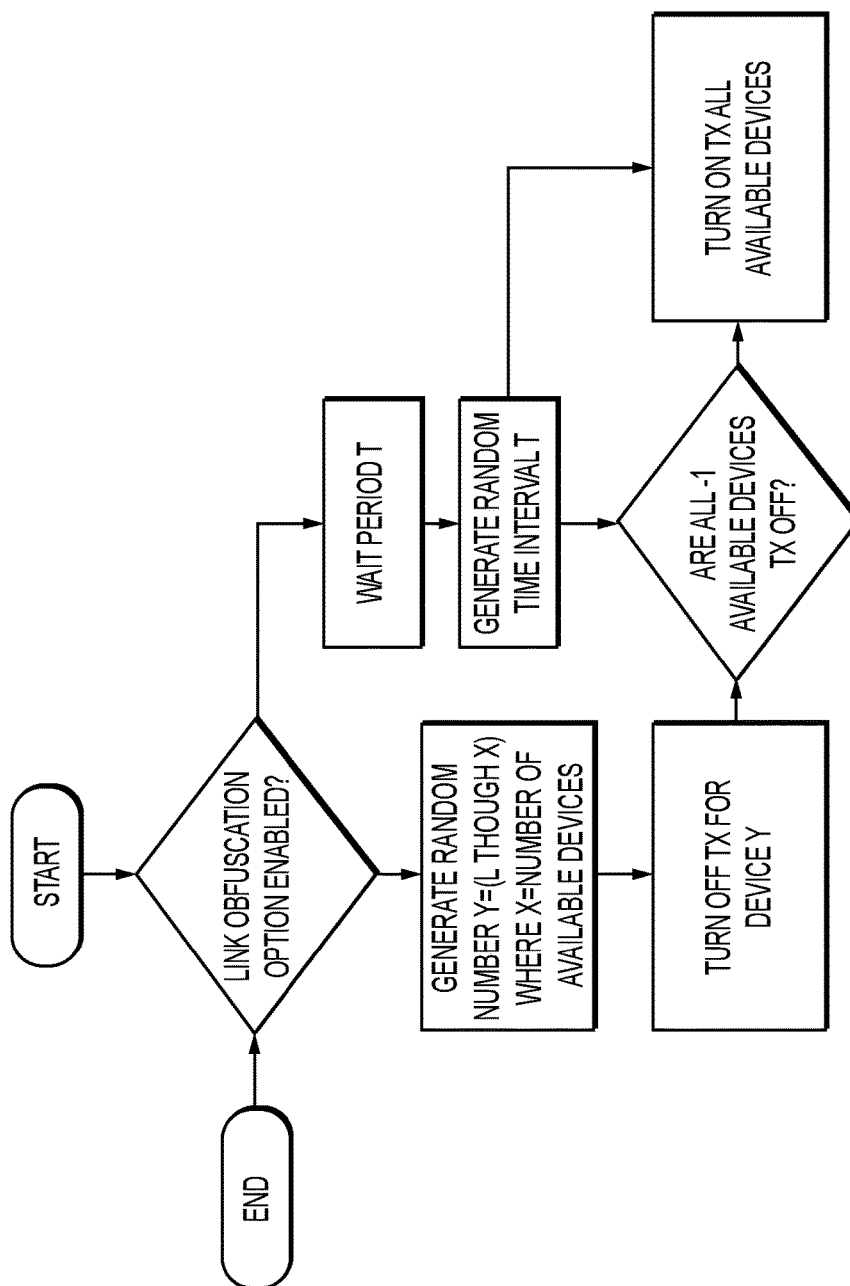
FIG. 4 depicts a sample logic flow diagram for communication obfuscation or failover use of multiple output paths from an embodiment of the present gateway.

In another example, as illustrated in FIG. 4, secure data to be sent out as WAN output can be disguised in a side band or otherwise so that an interceptor or other adversary may see the primary content as an internet videostream, YouTube video, or the like. Early examples of data inserted onto a transmission with a different primary purpose include Tele-Text and other insertions of digital information into the vertical blanking interval (VBI) of an analog television signal and such techniques may be familiar to one skilled in the since the 1980s or earlier. Other more recent examples of such prior art techniques for disguising sensitive data payloads include OutGuess, Steghide, Stegtools, and Ste-GUI applications. The present gateway can be combined with one or more such disguising techniques for sensitive data applications, and one skilled in the art may be familiar with other such techniques or applications.

In one embodiment suitable for defense applications, the gateway would be configured to be capable of receiving and transmitting data on military approved protocols. Such protocols currently exist under the overall umbrella scheme of the Defense Information Systems Agency (DISA) and its network DISN and may be administered otherwise in the future. In the current defense networks environment, Secure Internet Protocol Router/Non-Secure Internet Protocol Router (SIPR/NIPR) Access Point (SNAP) ground satellite terminals can be fielded to augment tactical network capabilities to extend network access to anyone desired, including, for example, forward operating bases (FOBS) at the company, platoon, and team levels. In the SNAP example, commercial Very Small Aperture Terminal (VSAT) satellite terminals can provide access to DISA's tactical networks (SIPR, NIPR, and Coalition), enabling mission command, information exchange (voice, video, and data), calls for fires, Medevac support, or other instructions or commands to be effectuated by or with the destination device(s).

SNAPs are a key communications component for smaller military units, often providing secure beyond-line-of-sight communications and network connectivity. SNAPs can be configured in many forms, including a transit case design to enable easy transport in a High Mobility Multipurpose Wheeled Vehicles, helicopter, other vehicle, or by a person, and the modular design can allow for varying dish and antenna sizes to appropriately satisfy mission requirements. The SIPR/NIPR protocols can allow robust, long-range, beyond-line-of-site SIPR, NIPR and Coalition network communications capability with a tactical company, platoon, team forward operating base, or an individual soldier. These protocols are interoperable with both the at-the-halt and on-the-move tactical network equipment, as part of tactical network architecture. The associated systems are easy to move around a battlefield, providing an expeditionary element to a force. These systems can have certified Ka and X-band capability to take advantage of the Department of Defense's (DoD) Wideband Global SATCOM satellites and can include C, Ku, Ka, X and L Band satellite links.

The gateway described herein can be configured for these current defense communications protocols and paths and can be configured in the future to accommodate future protocols and paths. The gateway middleware can be associated with a data structure maintaining a current record of connected devices and/or available output paths, and optimize the output to meet one or more desired objectives, such as sending all of the output over one path for ease or over multiple paths to minimize detection, avoid intercepted portions providing meaningful information to an adversary or other interceptor, or for any other purpose advanced by potentially portioning output data for delivery over multiple paths.

Figure 5:
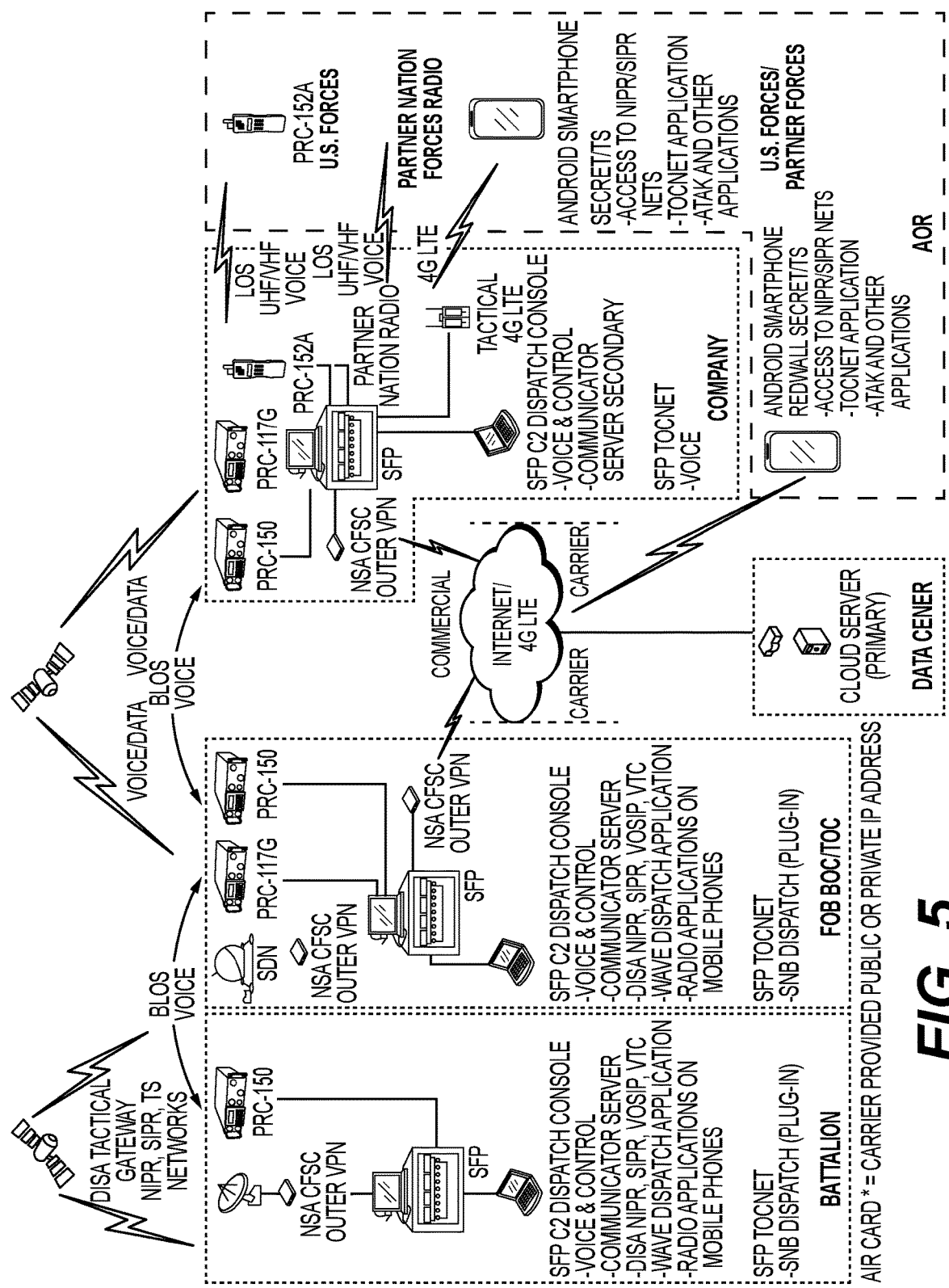
FIG. 5 illustrates one example of a WAN network topology for a defense or military application.

FIG. 5 illustrates network topology for one example of a defense or military implementation of the present gateway. In this figure, there are three gateway devices situated in three parts of the overall WAN. Each of the three gateways is labelled SFP (Signal Fusion Platform), which is shorthand for a gateway that is capable of communicating over the SIPR/NIPR networks currently established and managed under the DISA umbrella and thus part of the current defense or military protocol scheme. Each of the gateways is configured with software/middleware capable of translating or converting data in the incoming path's format and protocol into WAN data output in the selected outgoing path's or paths' format(s) and protocol(s).

From the left, there is one SFP depicted in the dashed box labelled Battalion. The Battalion SFP is shown associated with a laptop computer that can provide voice data processing capability and control over the operation of the SFP. A desktop or other computer or computing device can adequately perform these functions, and FIG. 5 depicts a laptop as a form factor convenient for mobile end use. The computer also acts as a communications server, or control any other servers in the network topology, and in this example allowing the Battalion SFP to communicate over a DISA network connection, NIPR protocol, SIPR protocol, voice over IP (in this case using VoSIP, or Voice over Session Initiation Protocol (SIP) which may also be accomplished using IEEE H.264 protocols), and Video TeleConferencing (VTC). This is an example of a defense network configuration and is not intended to limit this disclosure. The computer in this example further includes a WAVE dispatch application, referring to a Motorola software application that allows the computer to manage communications with Motorola radios, which themselves can be programmable or configurable for secure communications. The computer in this example further includes an application labelled SCI TOCNET, which refers to an SCI product suite also known as a Unified Voice Management System (UVMS), a communications platform designed to be deployed in expeditionary and other military operations. The Battalion SFP is further connected to a PRC 150, which is also known as a "manpack" or Falcon II, which is a mobile tactical HF and VHF radio manufactured by Harris Corporation, certified for communications using NSA Type 1 encryption. Finally, in this example, the SFP is shown as being able through a DISA Tactical Gateway to communicate with a DoD satellite over a National Security Agency (NSA) compliant virtual private network (VPN) connection under the NSA's Commercial Solutions for Classified (CSfC) Program, which enables commercial products to be used in layered solutions protecting classified NSS data. Each of the protocols and communications paths depicted for this Battalion SFP is by way of example only and is not intended to be limiting, and the wide array of communications paths shown depicts the range of the present gateway's "any-to-any" capability. In this sample configuration, the gateway SFP would be able to accept communications from a SIPR path and, for example, to convert and send the output over an HF or VHF path to a soldier or unit associated with a Falcon II manpack. The Battalion SFP, and all SFPs depicted in FIG. 1, contain software/middleware (computer readable instructions) that performs such functions, as discussed in the context of FIGS. 1-4 herein.

In the left center of FIG. 5, there is an SFP in the dashed box labelled FOB NOC/TOC, which refers to a Forward Operating Base (FOB), Naval Operations Center (NOC), or Tactical Operations Center (TOC). This SFP is configured similarly to the Battalion SFP, with several exceptions. The FOB/NOC/TOC SFP is also connected to a PRC 117G, which is another manpack, in this case Falcon III, which is a later release of a Harris Corporation mobile tactical HF/VHF radio than the Falcon II discussed above. This SFP is also shown communicating through a Software Defined Network (SDN) to the DOD satellite over an NSA compliant VPN. Both the Battalion and FOB/NOC/TOC networks are connected to each other for Beyond Line of Site (BLOS) voice communication through a software defined radio (SDR) discussed elsewhere in this application. Finally, this SFP is shown as being connected to the internet, again, through an NSA compliant VPN, allowing the FOB/NOC/TOC a path to receive internet data inputs and to generate internet outputs. In this sample configuration, the gateway SFP would be able to accept communications from a DoD satellite and, for example, to convert and send the output over an HF or VHF path to a soldier or unit associated with a Falcon III radio. Each of the protocols and communications paths depicted for this FOB/NOC/TOC SFP is by way of example only and is not intended to be limiting, and the wide array of communications paths depicts the range of the present gateway's "any-to-any" capability.

In the right center of FIG. 5, there is an SFP in the dashed box labelled Company, referring to that subunit of military troops, which is itself a subdivision of a battalion. The Company SFP is configured similarly to the previous two SFPs, with at least the following differences. The Company SFP can also be connected to Tactical 4G LTE, which can enable this SFP to connect to 4G LTE compliant devices, such as the Motorola LEX 11 Android Smartphone shown in this example, which is discussed elsewhere in this application, and which can allow for various LTE based communications, commands, and instructions. This SFP can also connect to a PRC 152A, which is an L3Harris Falcon III AN/PRC-152A radio that can provide simultaneous voice, video, and high-speed data in a highly portable form factor. Employing the Soldier Radio Waveform (SRW) and L3Harris Adaptive Networking Wideband Waveform (ANW2® C.) this handheld device delivers ad-hoc, self-healing (i.e., repairing or reconstructing network availability through peer-to-peer, mesh, or other techniques that reconfigure reinstate network connectivity), and adaptive networking capabilities. This SFP is further shown to be in communication with the other two SFPs shown, as well as other US Forces using a PRC-152A, Partner Nation Forces radios, the internet, and the DoD satellites via NSA compliant VPNs. In this sample configuration, the gateway SFP would be able to accept communications from a DoD satellite and, for example, to convert and send the output over tactical 4G LTE to a Motorola LEX 11 handset. Each of the protocols and communications paths depicted for this Company SFP is by way of example only and is not intended to be limiting, and the wide array of communications paths depicts the range of the present gateway's "any-to-any" capability. Each of the three SFPs showing in FIG. 5 can also be configured to communicate with each other, such that connections or paths available to one SFP can be made available to the other SFPs or their respective users.

Figure 6A:
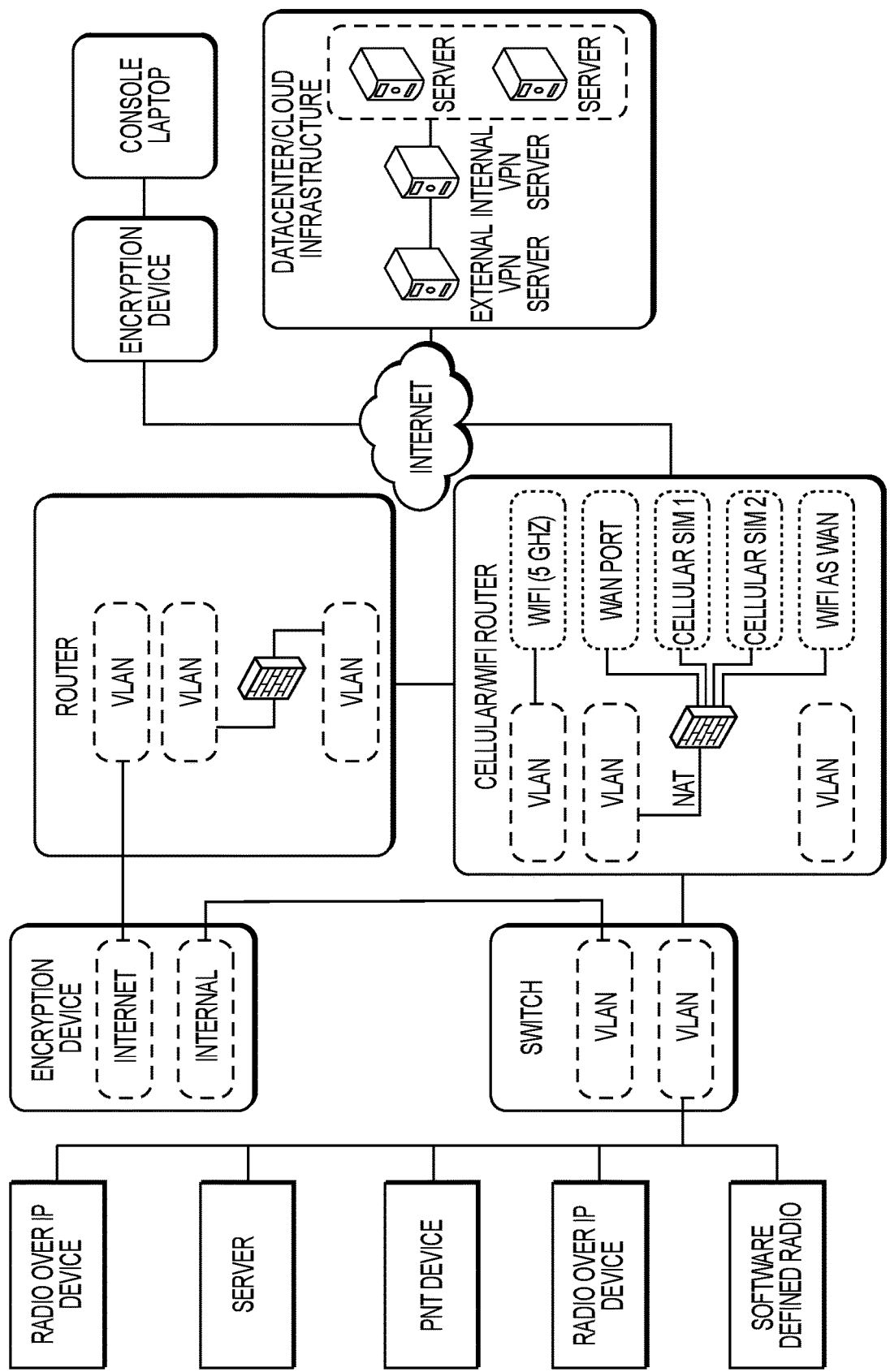
FIGS. 6A-6B illustrate a high-level and detailed example of network topology for the present gateway.
Figure 6B:
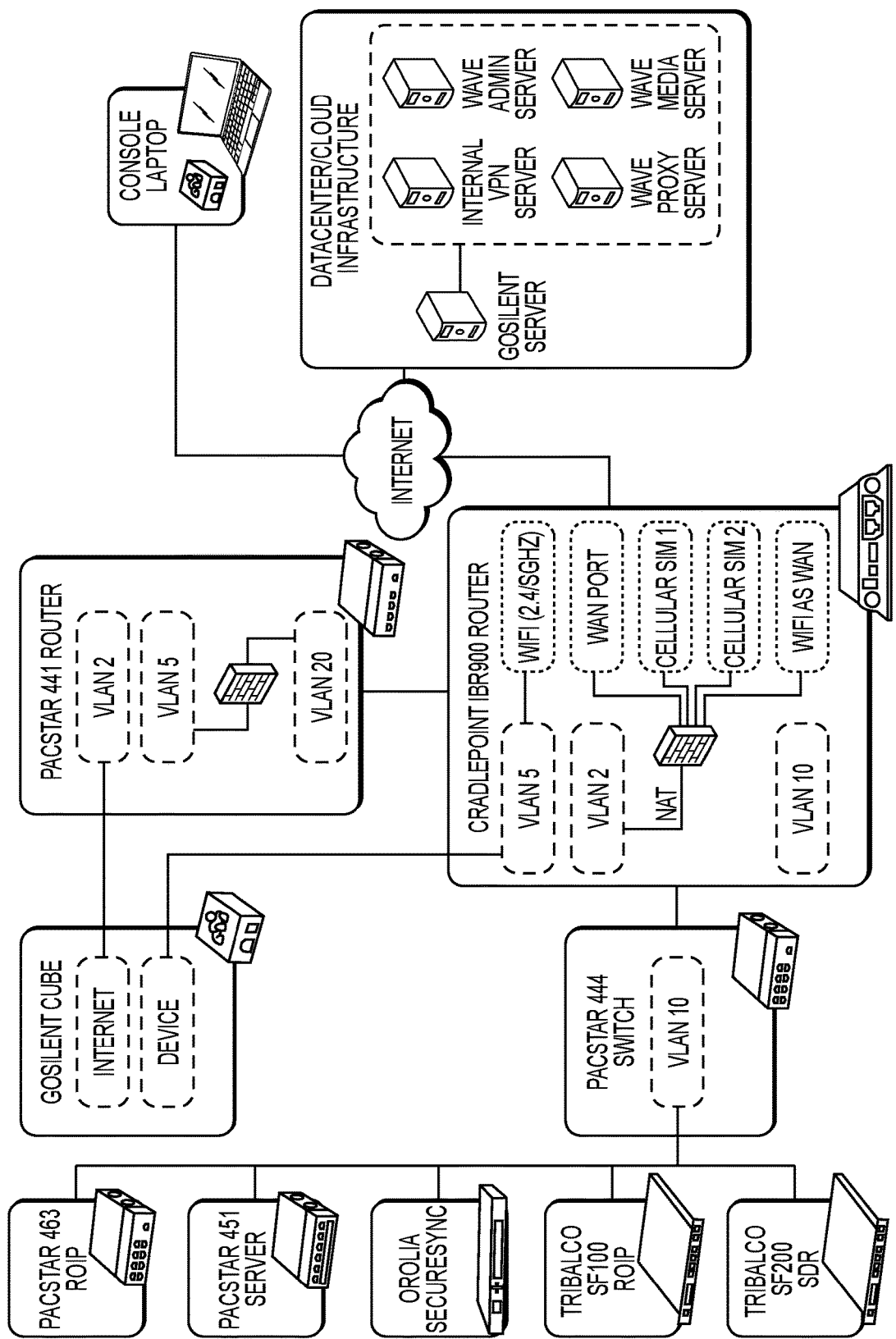

FIG. 6A illustrates a high-level example of an SFP's network topology. FIG. 6B depicts a detailed example of FIG. 6A and shows the SFP's network topology in which the SFP gateway is identified as an SF1000, including various switches, routers, and other componentry shown by way of example only. As in FIG. 5, the computer in FIG. 6 provides a control console for the SFP. The PacStar 463 RoIP can provide Land Mobile Radio (LMR)-to-IP data conversion, interoperability between different radio types, radio crossbanding, and remote radio control over IP, in a small form factor, rugged module. This illustrates the gateway's ability to be agnostic to the configuration or protocol of a particular input or output technology, contrasted with prior art systems in which, e.g., a Motorola radio may not be able to speak with (i.e., receive from or send to) a Harris radio or to receive/send data over an internet VoIP protocol. In contrast, the present gateway can accept communications from all available paths, irrespective of protocol, and process that payload to be sent to any other available device, irrespective of protocol. When combined with other PacStar 400-Series modules, PacStar 463 can bridge gaps between IP-based communications networks and LMR tactical radio networks, including providing comprehensive, tactical, and mobile interoperability solutions. This sample PacStar 463 supports up to four radio networks simultaneously. It can convert E&M signals (i.e., a type of supervisory line signaling that uses DC signals on separate leads called the E and M leads, traditionally used in the telecommunications industry between telephone switches) to IP data and can provide cross-banding and radio control through industry standard RJ45 and RS-232 interfaces. PacStar 463 is based on proven, software defined technology adapted from SCI TOCNET G4 products deployed in thousands of systems and over 50 major defense programs. The PacStar 451 Server can provide a high-performance, virtualized appliance for hosting multiple software applications in a compact, quick setup, rugged form factor. Designed for in-theater communications, executive communications, vehicle-mount, entry or forward-operating base deployments for military, Homeland Security, first responders, and commercial/enterprise users. PacStar 451 is available with a wide variety of pre-loaded, pre-secured, and pre-qualified software applications appropriate for use in the tactical communication applications. The Orolia SecureSync which provides PTP protocol as used in PNT (discussed elsewhere herein) employs unique software algorithms to detect anomalies in GPS signals, including unintentional interference and malicious attacks. The integrated solution provides notification, alarming and automatic disabling of GPS/GNSS synchronization. The Tribalco SF100 RoIP, which can be a Telex IP224 device, Tribalco SF200 SDR (an SDR that may contain (4) 10 MHz to 6 GHz radios, each running independent waveforms, and compatible with over 100 radio manufacturers) or other device that is interoperable with C-Soft and/or IP-224. In this embodiment, the gateway can interface with a modified Telex IP-224 dual IP remote adapter, which employs a Linux operating system and provides a reliable platform for remote control of two audio devices and can be configured to work with both digital and analog consoles. The Telex adapter performs a wide variety of other tasks related to operating radios on a digital network, including diagnostics. The GoSilent Cube is a hardware VPN that allows secure communication using NSA compliant encryption, including CSfC, NSA elliptical curve, AES 128, AES 256, MPP Blockchain (using standard, NSA, or other keymats), or other telecommunications encryptions technologies suitable for particular applications and with which one skilled in the art would be familiar, using. The PacStar 444 Switch is based on the Cisco Embedded Services Switch (ESS) 3300 and provides high-density network access at Gigabit speeds for critical voice, data and video connectivity in a compact, rugged form-factor. The PacStar 441 Router provides high-performance routing, switching and advanced network services for critical voice, data and video connectivity in a compact, quick setup, ultra-compact form factor. PacStar 441 is based on Cisco® technology and provides up to 4 ports of PoE LAN access. The CradlePoint IBR900 Router provides Gigabit-Class LTE connectivity as well as Ethernet and Wi-Fi. Through the internet, the SFP is shown as being connected to an external datacenter or cloud infrastructure, such as Microsoft's Azure cloud infrastructure, Amazon Web Services (AWS), Google Cloud, or another suitable dedicated or cloud infrastructure. Each of the protocols and communications paths depicted for this sample SF1000 configuration is by way of example only and is not intended to be limiting, and the wide array of communications paths depicts the range of the present gateway's "any-to-any" capability.

Figure 7A:
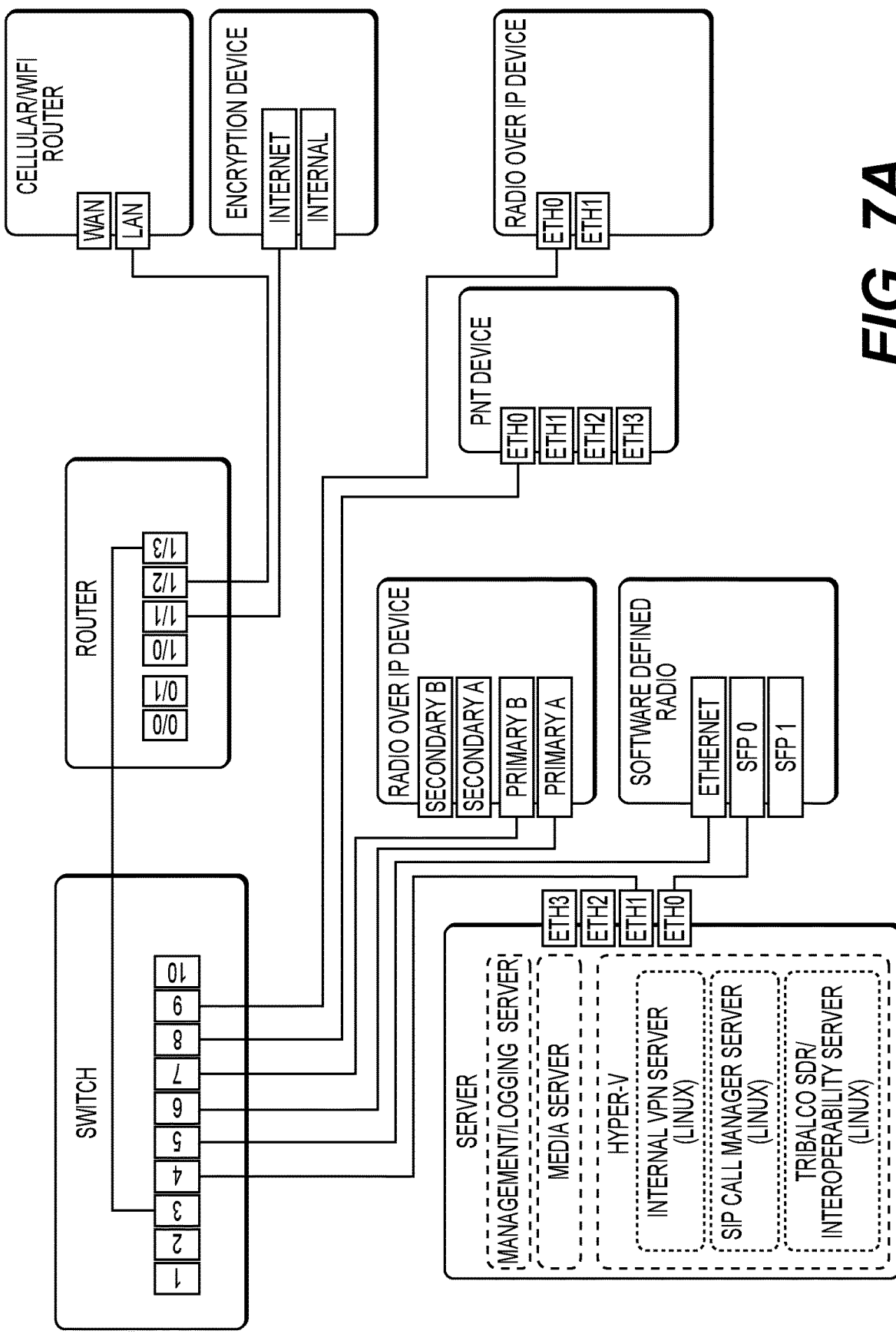
FIGS. 7A-7B illustrate a high-level and detailed example of ethernet connections for one example of network topology for the present gateway.
Figure 7B:
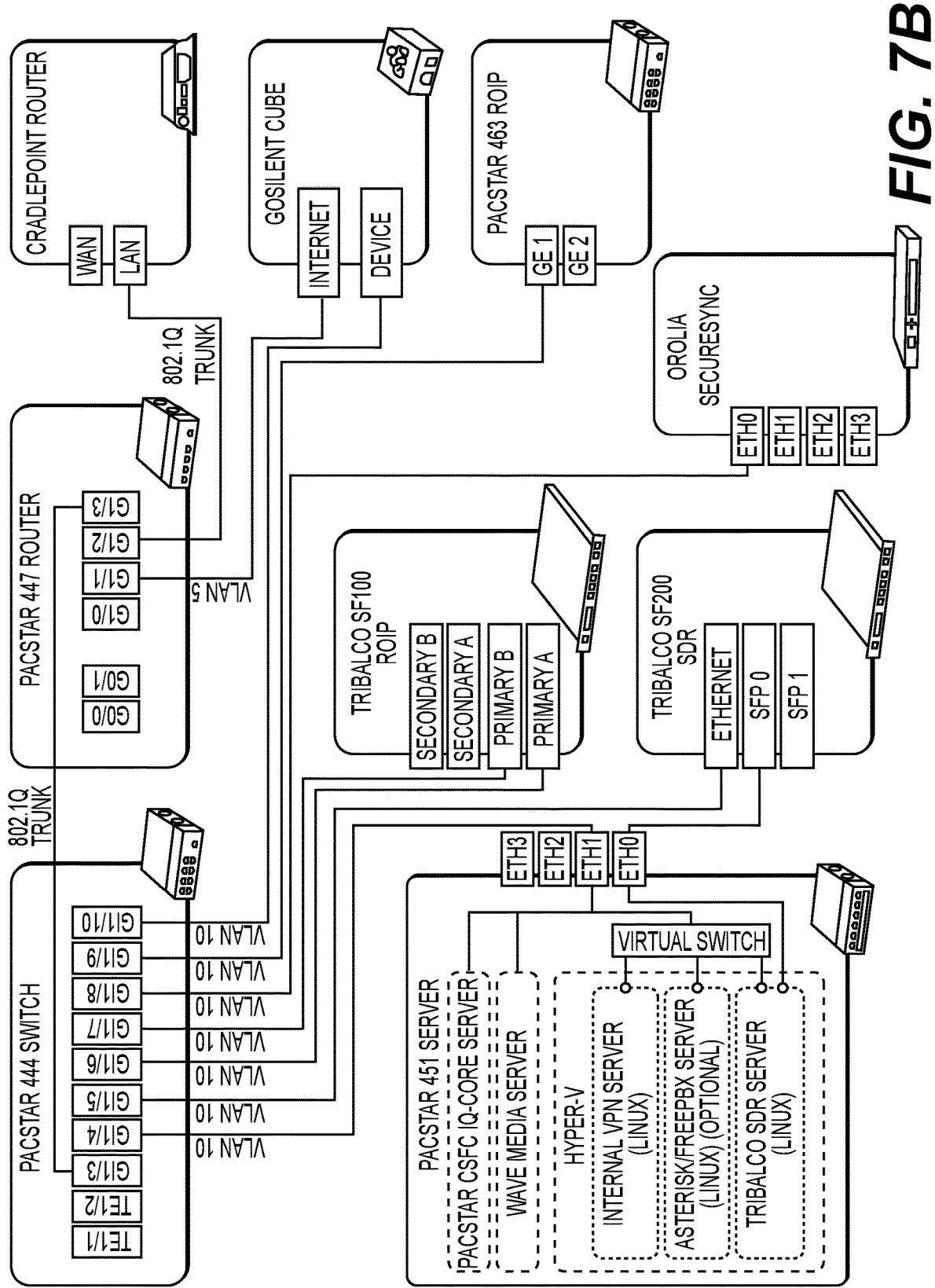

FIG. 7A illustrates a high-level example of a possible ethernet connections. FIG. 7B depicts a detailed example of FIG. 7A and shows the possible configuration of the internal ethernet connections between the various components, discussed above, of the SFP/SF1000 depicted in FIG. 6. Each of the wires, connections, internal paths, or buses depicted in FIG. 6 is by way of example only and is not intended to be limiting.

Figure 8A:
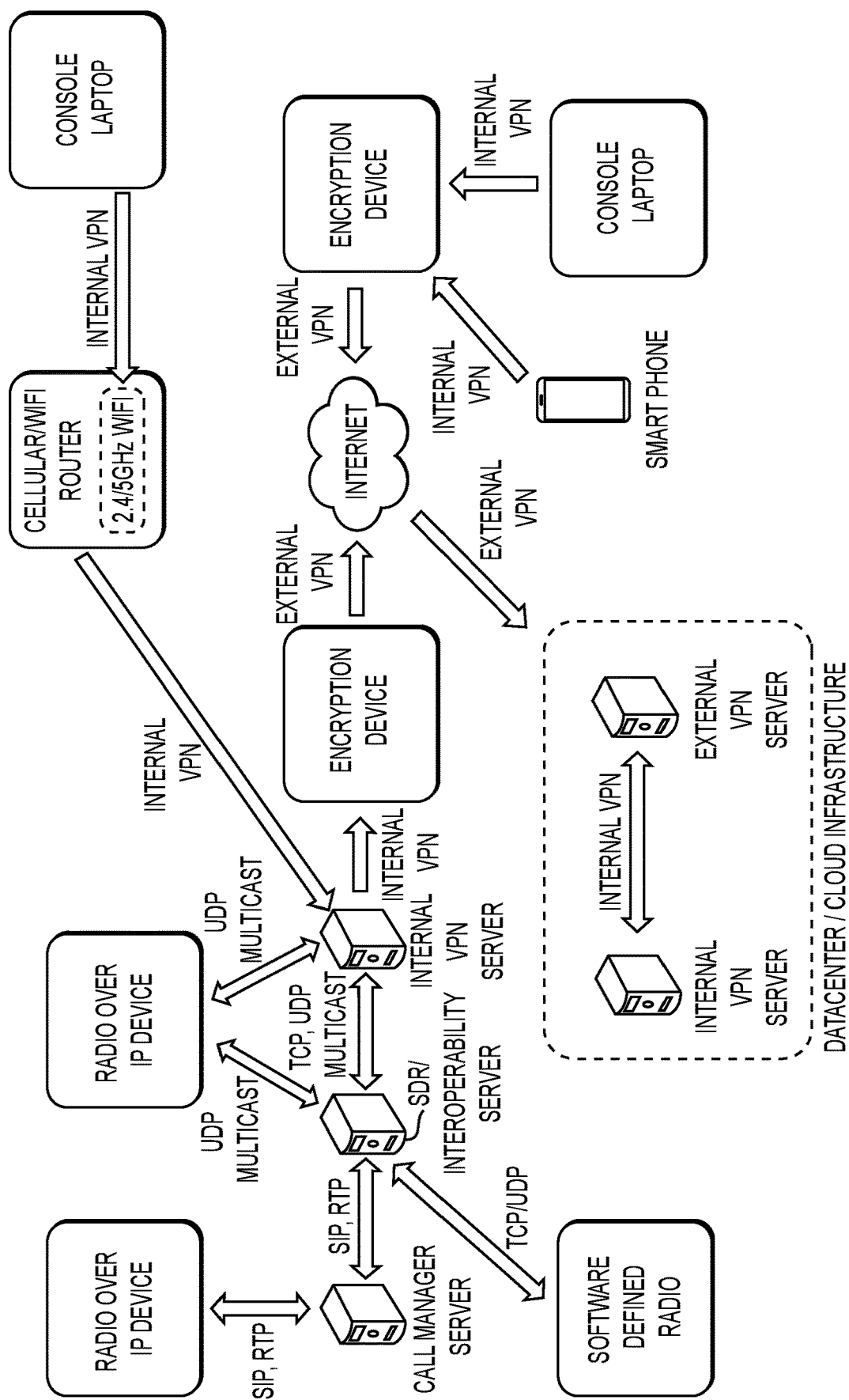
FIGS. 8A-8B illustrate a high-level and detailed example of data flow for one example topology for the present gateway.
Figure 8B:
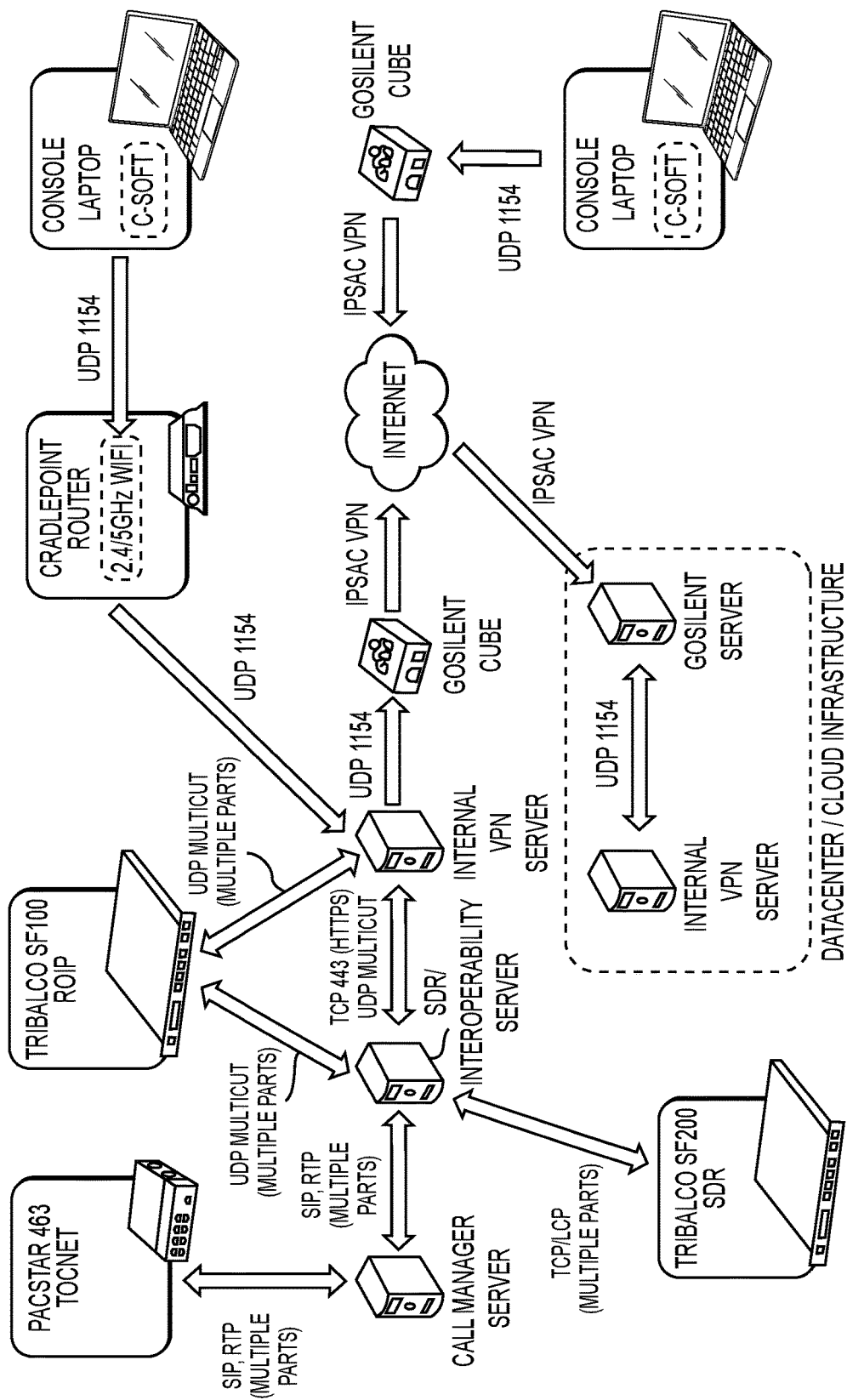
Figure 9A:
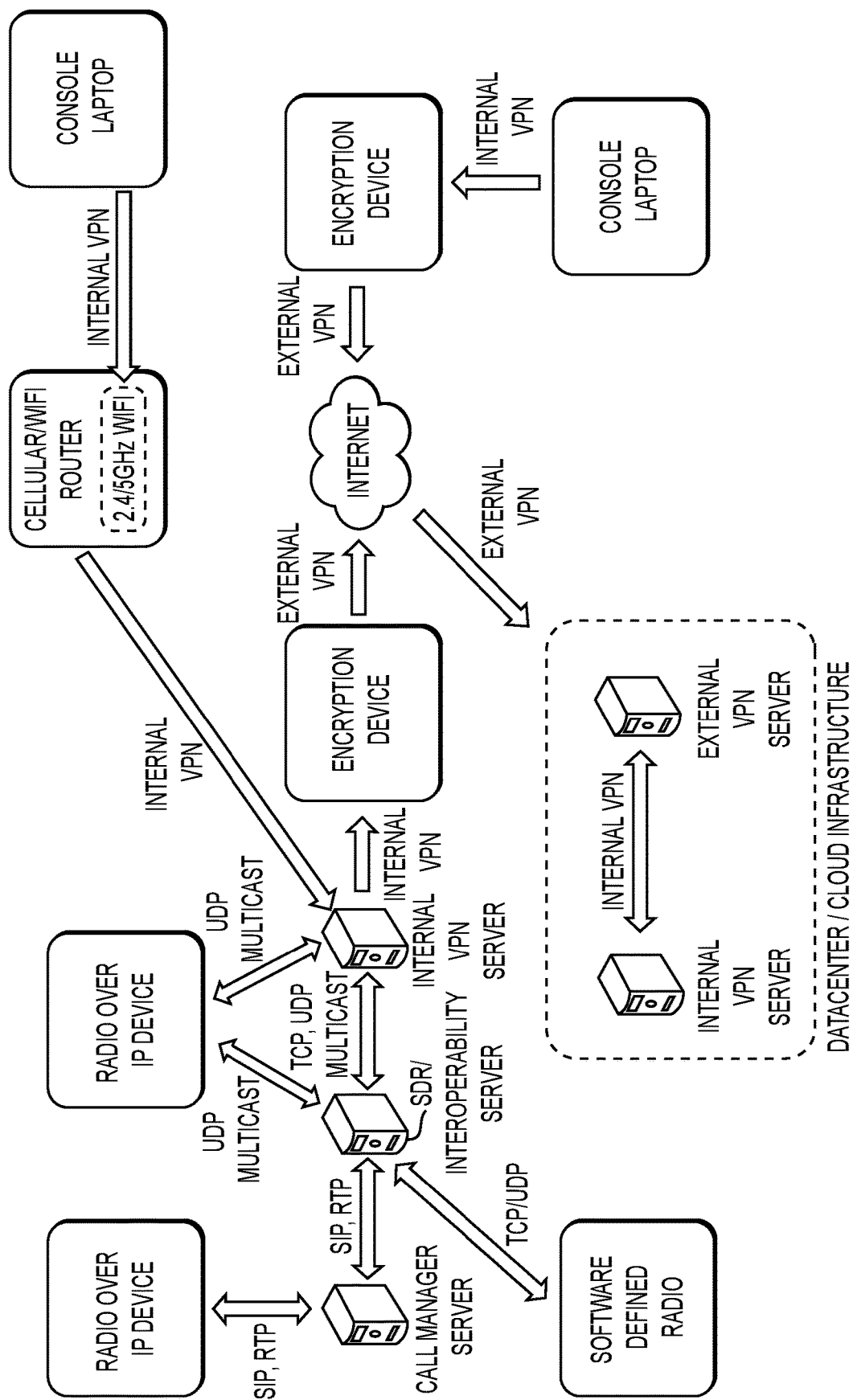
FIGS. 9A-9B illustrate a high-level and detailed example of data flow for one example topology for the present gateway.
Figure 9B:
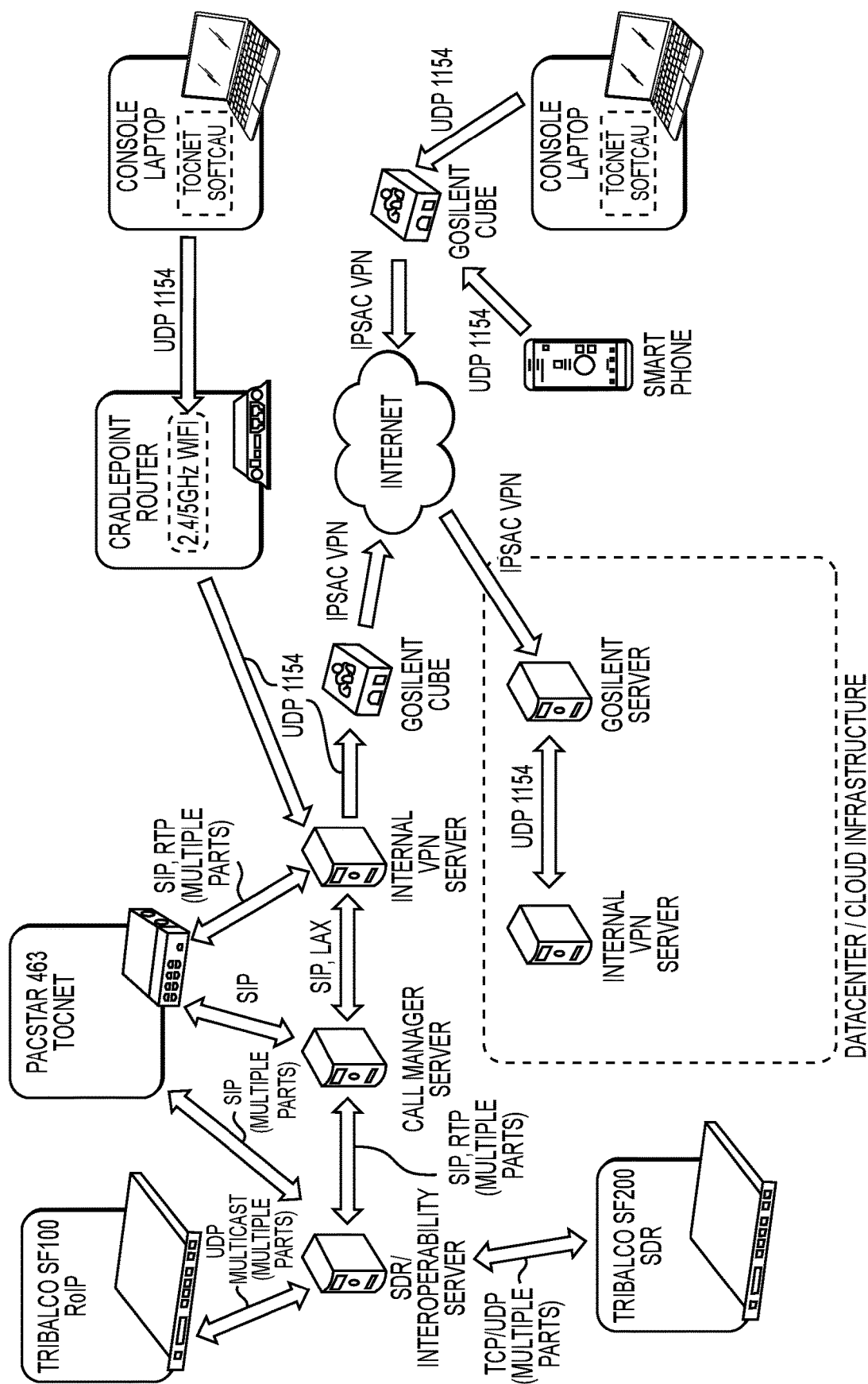
Figure 10A:
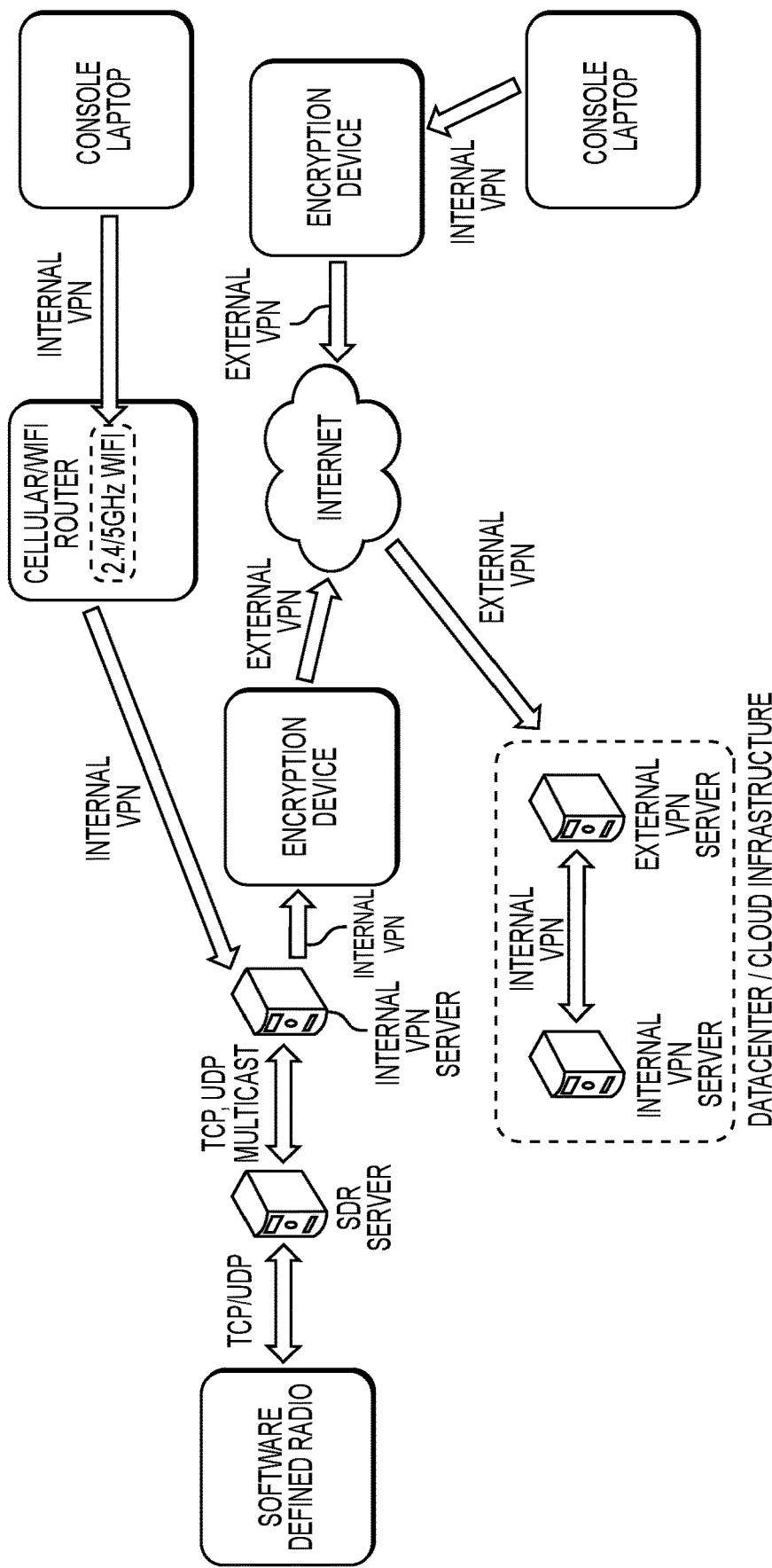
FIGS. 10A-10B illustrate a high-level and detailed example of data flow for one example topology for the present gateway.
Figure 10B:
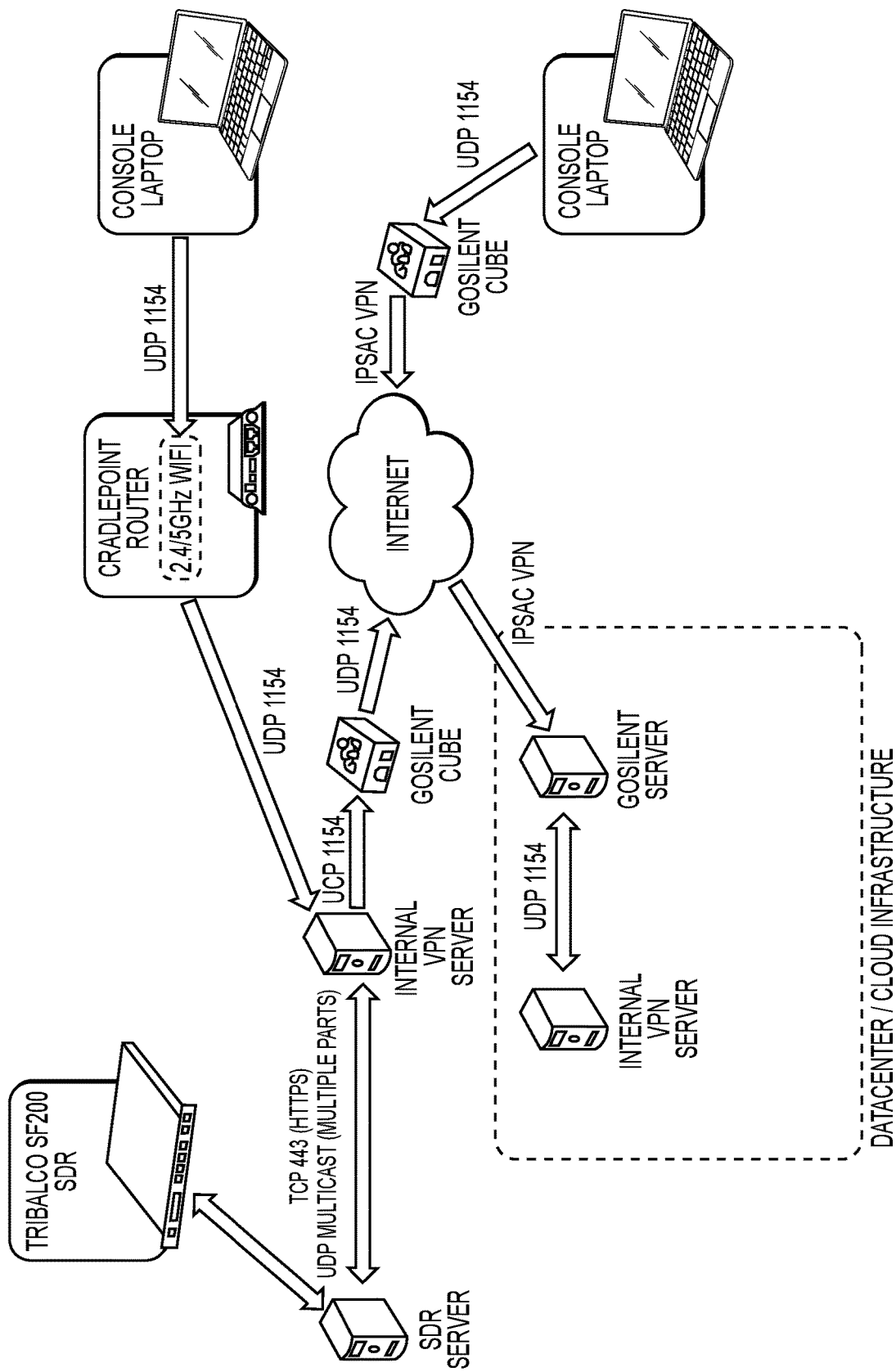

FIGS. 8A, 9A and 10A illustrate high-level data flow diagrams showing connections between and among the various components. FIGS. 8B, 9B and 10B illustrate additional details of FIGS. 8A, 9A and 10A, respectively within the SF1000/SFP in sample configurations of a network including the present gateway. In particular, FIGS. 8A and 8B depict a sample data flow for a C-Soft based network configuration, FIGS. 9A and 9B depict a sample data flow for a TOCNET based network configuration, and FIGS. 10A and 10B depict a sample data flow for an SDR based network configuration. The various protocols for communications between the components are identified in association with arrows representing data flow and direction, whether one way or duplex (e.g., SIP, RTP, TCP 443, etc.). The SF1000 includes the PacStar 463 TocNet, Tribalco SF100 RoIP, Call Manager Server, SDR/Interoperability Server, and an Internal VPN Server.

In another embodiment, the gateway can be associated with a software defined radio (SDR) to expand the wireless output paths available to the gateway and its middleware. The SDR may be stationary or mobile and capable of being setup in a variety of locations or transported by a vehicle, human, or otherwise. In one such embodiment, the SDR can be 3U OpenVPX Dual Channel HF/VHF/UHF/Microwave Transceiver Module. The HTLv-C is a 3U VPX reference chassis, designed per Technical Standard for Sensor Open Systems Architecture (SOSA™). It can be aligned to Snapshot 2 and Snapshot 3 versions as well as different number of slots, such as 19-Slot and 11-slot, 3U VPX Chassis, capable of 19 SDR modules installed and each radio capable of transmitting over 4 independent waveforms or EW techniques. As such, in this embodiment, the SDR enables up to 76 independent waveforms or EW techniques. In an alternative embodiment, the SDR can be a 3U Open VPX Quad Channel HF/UHF/VHF Transceiver Module configured as a board, card, or blade that can be inserted into another chassis. Such an SDR can have a frequency range of 2 MHz-6 GHz, 80 MHz instantaneous bandwidth for each channel, 50 μsec tuning speed, with four channels configured to transmit or receive, and can be dynamically configurable in 20 μsec, using coherent or independent tuning. In another alternative embodiment, the SDR can be a SIGINT Transceiver System, configured as a manpack, with a 3U VPX SDR SWaP-C Software Defined Radio (SDR) wideband transceiver. By defining these waveforms tactically, the gateway can instruct the SDR to parse and transmit a data package over one or a multitude of paths using different waveforms. In this embodiment and within current technological capabilities, a single server (within the overall gateway topology) can instruct and implement up to 4 defined waveforms, requiring multiple servers for more complex waveform creation and use. In this example, the SDR can be positioned on a drone, in another vehicle, or on a person to provide service where service is otherwise disrupted and thus provide self-healing functionality. This can be useful in natural disaster and other situations in which infrastructure has been disrupted, and the current gateway in conjunction with an SDR can substitute for hard infrastructure. FIG. 10 depicts a data flow diagram between and among the various components in another configuration of a network including the present gateway in which the Tribalco 200 SDR is included to allow WAN output through the SDR, including with custom waveforms discussed elsewhere herein. Custom waveforms can be created using C++, 'Janson.' Python, Java, or other software that can define frequency, hop, duplex, time of day, key parameters, output power, or other parameters that will allow for waveform customization. There is a separate GUI that represents frequency and bandwidth. The present gateway can also have a graphical user interface (GUI) that allows a user to specify frequency, bandwidth, or other particulars to customize the outgoing radio waveform. The precise type or brand of SDR is not intended to be limiting, and one skilled in the art will appreciate that there is a wide range of commercial SDRs available, and the particular objectives to be achieved (e.g., which bands, spectrum, communications paths or technologies are desired) will drive the selection of an appropriate SDR or multiple SDRs. An SDR that is configurable and allows communications over the desired paths should satisfy the needs of the present disclosure, and one preferred feature of an SDR may be the degree to which it allows the use of customized waveforms, as discussed elsewhere herein.

In another embodiment, the gateway can be associated with a source of Assured Position, Navigation, and Timing (PNT) information. PTP protocol can improve reliability, performance, and safety of mission-critical applications in the air, on land, and in the sea. One example of a suitable PNT is an Orolia SecureSync SAASM that can combine precision time and frequency technology with an ultra-secure Selective Availability Anti-Spoofing Module (SAASM)-based GPS receiver which complies with DoD requirements that GPS systems be SAASM-compliant. SecureSync SAASM can be available commercially as a 24-channel Miniature Ruggedized Unit (MRU) or a 12-channel Ground-Based GPS Receiver Application Module (GB-RAM), and these brands and form factors are not intended to be limiting to this disclosure. Mission-critical military applications will benefit from SecureSync SAASM's extreme reliability, security, and flexibility. One advantage of SecureSync SAASM is its ruggedized shock and vibration-tested chassis, designed to meet MIL-STD-810F for environmental performance. The base unit provides an extremely accurate 1PPS timing signal aligned to a 10 MHz frequency signal without any 10 MHz phase discontinuity. An assortment of internal oscillator options is available to fulfill a broad range of requirements for holdover and phase noise. The modular design enables a wide variety of highly specialized time and frequency functions. In currently available products, up to 4 additional input/output modules can be added to each SecureSync SAASM, as well as optional cards to add custom configuration of timing signals, or a 1PPS time code (IRIG, ASCII, HaveQuick) or other, frequency outputs (10 MHz, 5 MHz, 2.048 MHz, or 1.544 MHz), telecom T1/E1 data rates, multi-port NTP, and PTP. In another embodiment, the PNT functionality of the gateway can be enhanced with eLoran. This additional combination of network components can provide further PTP data in GPS/GNSS outage or unavailability scenarios. The PNT eLoran System (PeLS) can function when GPS cannot, can be difficult to jam, can be combined with pseudo random pulses and data channel to make datastreams unusable for those without an encryption key, can provide precise wide area coverage, can provide a robust emergency broadcasting signal for first responders and the like, and can provide bearing and azimuth data while a user is stationary. WWV broadcast radio is also another known source of time and date information. Because of the atomic clock functionality that the Orelia SecureSync or Versa devices or other suitable atomic clocks can provide internal to the present gateway, or eLoran or WWV broadcast radio or other external sources that can provide PNT information, the present gateway can maintain Assured PNT irrespective of the presence or absence of GPS, allowing for precise synchronization among and between the various network components and the transmissions therebetween.

Figure 16:
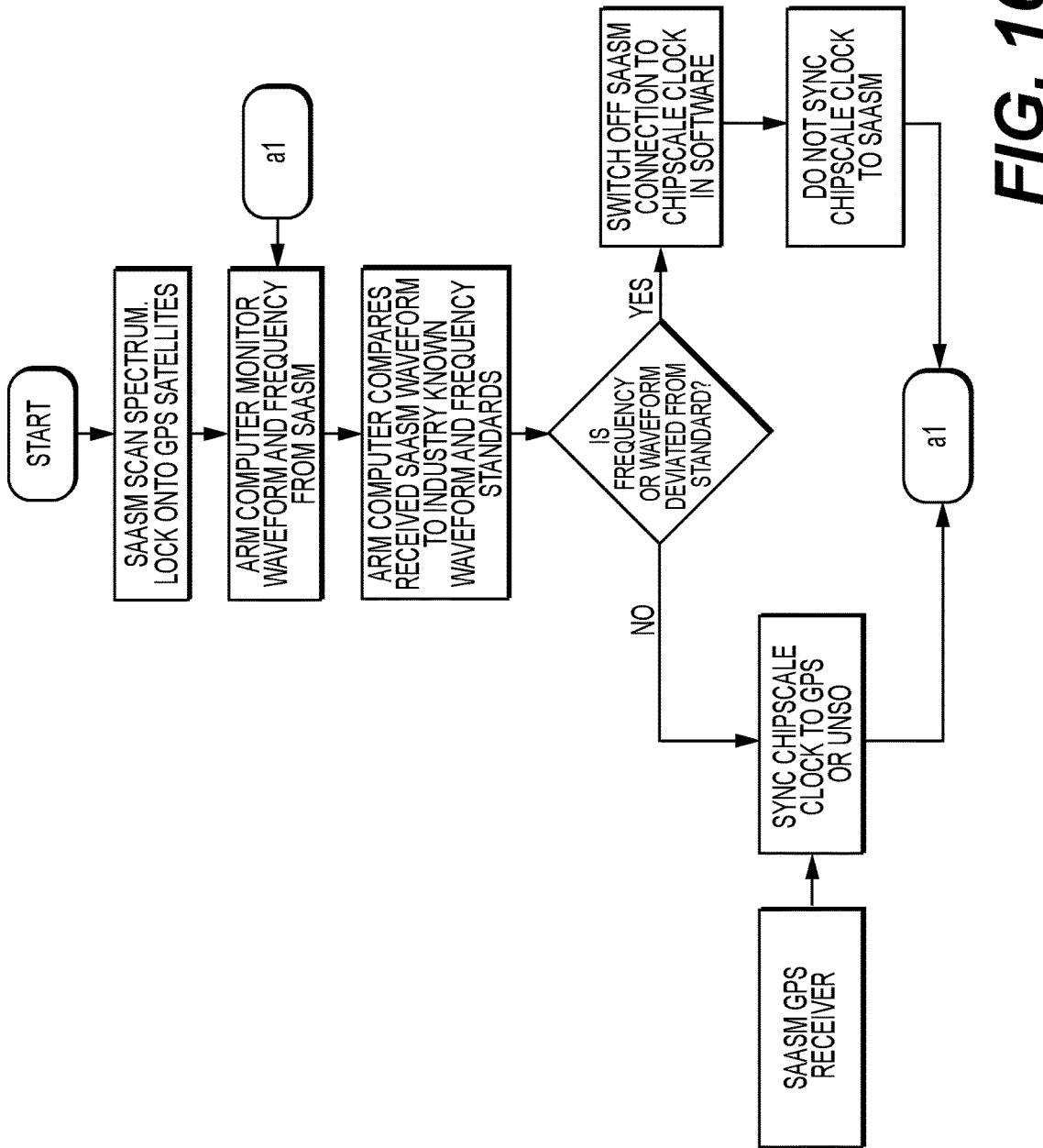
FIG. 16 depicts a sample logic flow diagram for implementing time and synchronization data from an atomic clock, depending on the nature of incoming GPS signal(s).

In another embodiment, the gateway can employ software capable of scanning available spectrum to identify GPS satellites and determine whether incoming GPS signals from such satellites conform to applicable waveform, frequency, or other standards, choosing to synchronize an onboard atomic clock with such incoming data or not synchronize with such incoming data if a GPS signal does not conform with applied standards, indicating that the incoming GPS signal is not authentic or accurate, perhaps because of alteration or interference. An example of such software is depicted in the logic flow diagram in FIG. 16. As shown in FIG. 16, the software scans available spectrum to identify GPS signals. A military-grade SAASM can lock on to one or more available GPS satellites and provide frequency and waveform information associated with those signals to a comparator. The comparator can thus monitor available GPS signals and compare frequency, waveform, or other information to applicable standards, whether industry standards or standards defined in the gateway, and determine the validity or desirability of incoming GPS data. If an incoming GPS signal conforms to applied standards, the software can synchronize an onboard atomic clock, identified in FIG. 16 as a chip-scale clock, to that incoming GPS signal. In this scenario, the chip-scale atomic clock will always operate as the master timing source on SDR communication paths, it will maintain synchronization to a validated incoming GPS signal to prevent the local clock from drifting or deviating beyond applicable standards. If an incoming GPS signal deviates from applied standards, the SAASM comparator can disconnect the chip-scale atomic clock from the timing sync signal and allow the onboard atomic clock to operate independent of such incoming signals. Although the figure depicts this process with respect to a single GPS signal, it can also be done repetitively with respect to multiple GPS signals or UNSO input. In processing available GPS signals, the gateway can use signal strength, signal to noise ratio (SNR), or other measures to choose or prioritize among available GPS signals. FIG. 16 also depicts, in the lower left quadrant, an aspect of the gateway software that can extract Network Time Protocol (NTP) data from an onboard atomic clock. NTP is a networking protocol for clock synchronization between computer systems over packet-switched, variable-latency data networks. NTP can be accurate in the range of 100 milliseconds, whereas more precise and current time data from GPS, discussed elsewhere in this application as assured PTP, can be accurate in the range of 1 microsecond. As such, the PTP protocol can be more accurate and introduce less latency than NTP.

In another embodiment, the gateway is configured for enterprise or commercial applications using protocols suitable for such communications. In the current enterprise or commercial networks environments, many protocols are used, including the Internet Protocol Suite of protocols, which includes the Transmission Control Protocol (TCP) and the Internet Protocol (IP). UDP (User Datagram Protocol) is a communications protocol that is primarily used for establishing low-latency and loss-tolerating connections between applications on the internet. It speeds up transmissions by enabling the transfer of data before an agreement is provided by the receiving party. As a result, UDP is beneficial in time-sensitive communications, including voice over Internet Protocol (VoIP), domain name system (DNS) lookup, and video or audio playback. UDP is an alternative to TCP in the protocol stack with which one skilled in the art would be familiar.

In another embodiment, the present gateway can employ a multi-party protocol to allow block chain-based encryption or telecommunication. While many legacy protocols allow point-to-point communication, the gateway described herein can employ a multi-party protocol (MPP), typically a constellation protocol that uses multiparty computation (MPC), sharing consensus between n parties in a constellation, obviating central authorization, signature, or trust. This can be an any-to-any protocol. MPP can be used to establish secure multi-party connections between authenticated entities. Connected entities can be equipped to make distributed computations (MPC) to form multi-party decisions, thereby creating consensus-based decision making. MPC can allow a group of servers to provide inputs to an arithmetic or Boolean circuit and securely evaluate the circuit in the presence of an adversary who may corrupt a fixed portion of the servers. When the adversary corrupts a server, it can learn all information stored on that server. The adversary can force corrupt servers to behave arbitrarily, irrespective of the protocol. One commercial source of software enabling the use of MPP and/or MPC is Prive Comms, in addition to other members of the MPC Alliance, an industry organization to which blockchain-based technology providers belong.

Figure 11:
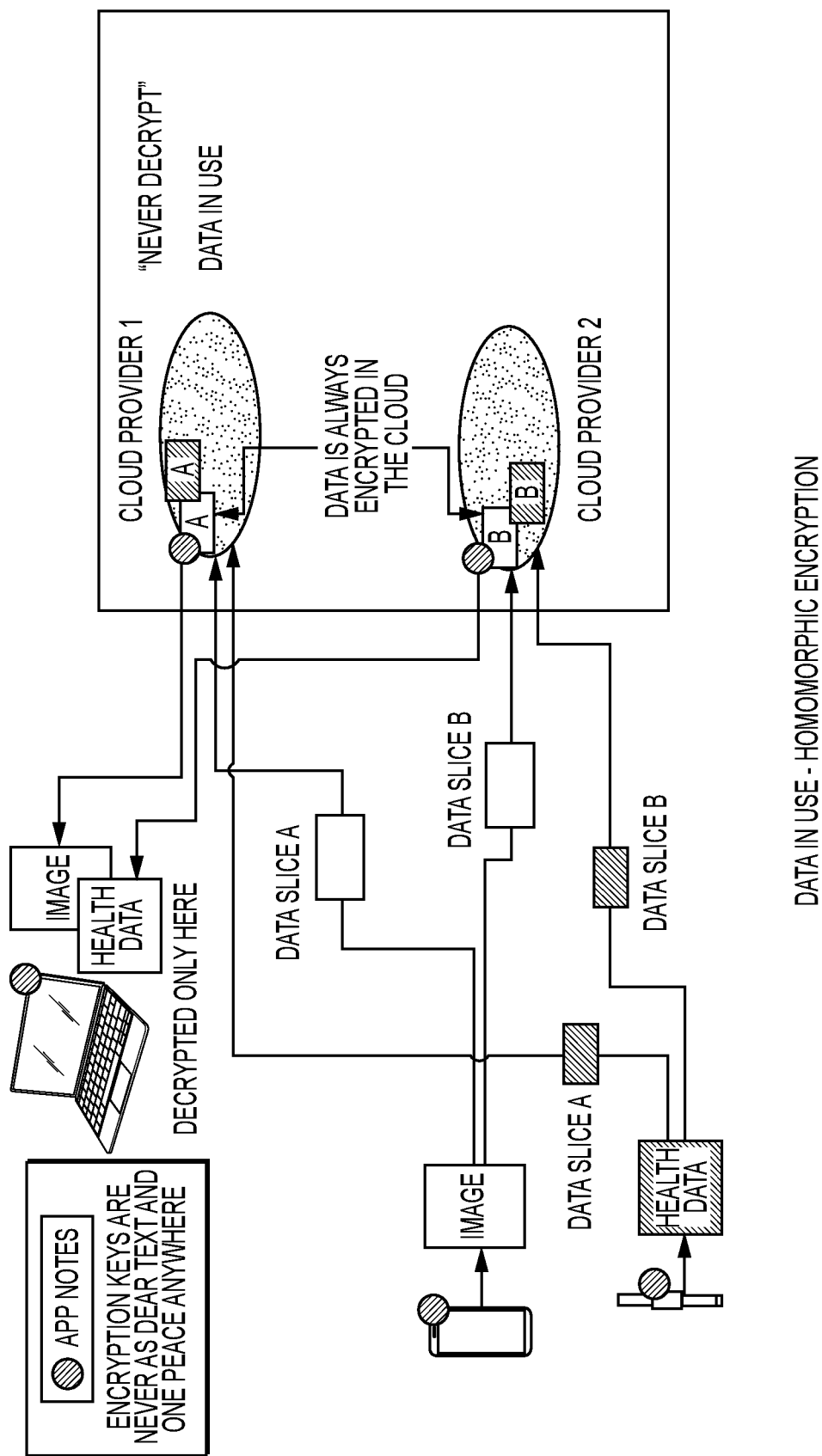
FIG. 11 illustrates a sample use of MPP in which data is communicated between the present gateway and cloud storage.
Figure 12:
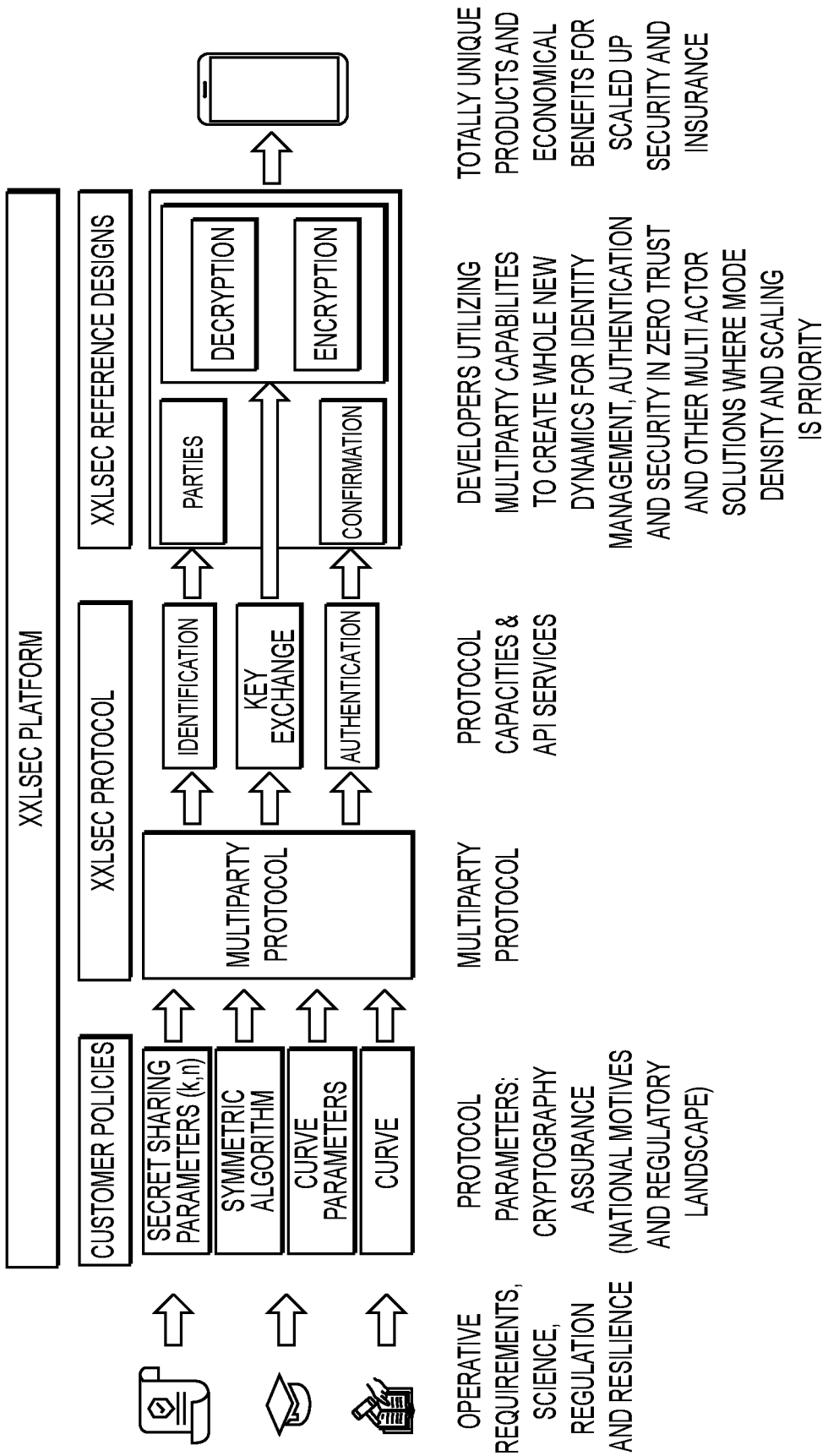
FIG. 12 illustrates aspects of an MPP protocol.
Figure 13:
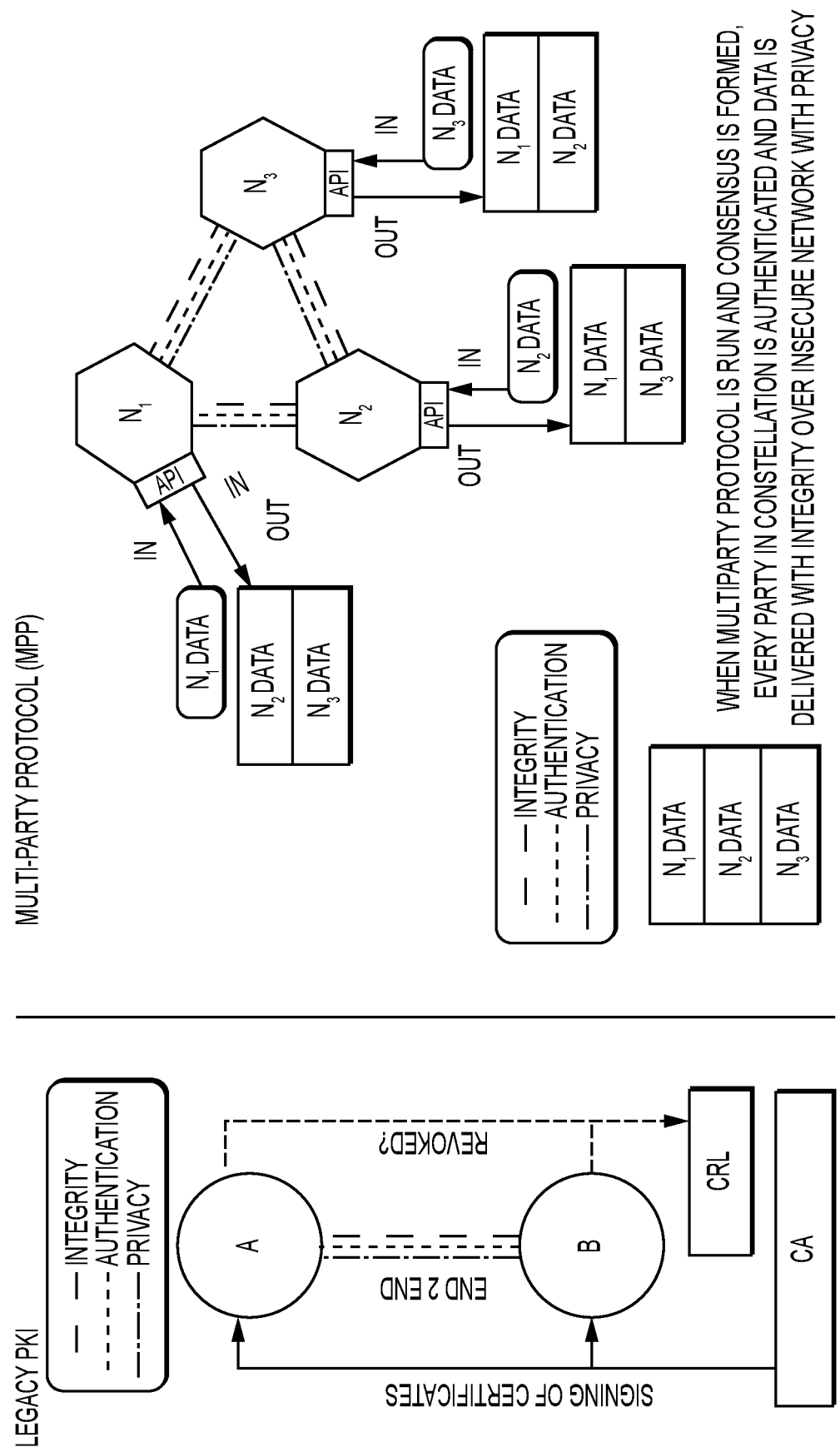
FIG. 13 illustrates some potential differences between MPP and public key infrastructure-based encryption.
Figure 14C:
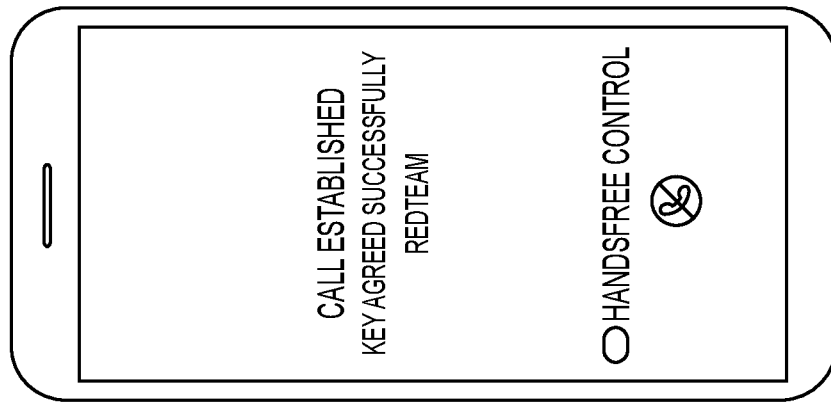
FIGS. 14A-14G illustrate a handset shown as having received voice and data communications from the present gateway.
Figure 14B:
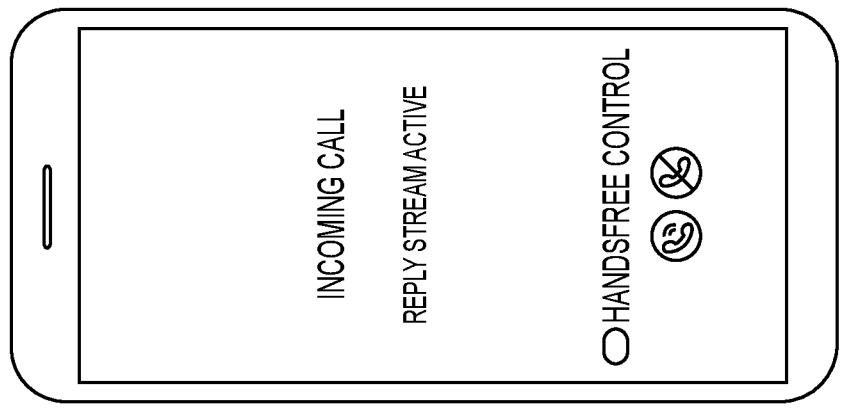
Figure 14A:
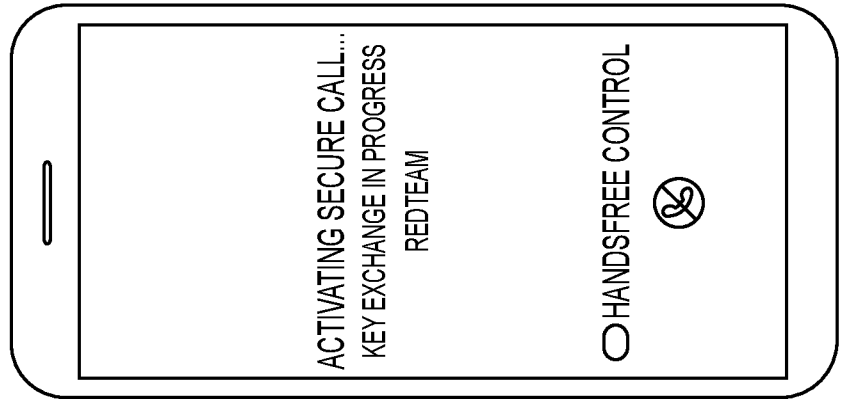
Figures 14D, 14E, 14F, 14G:
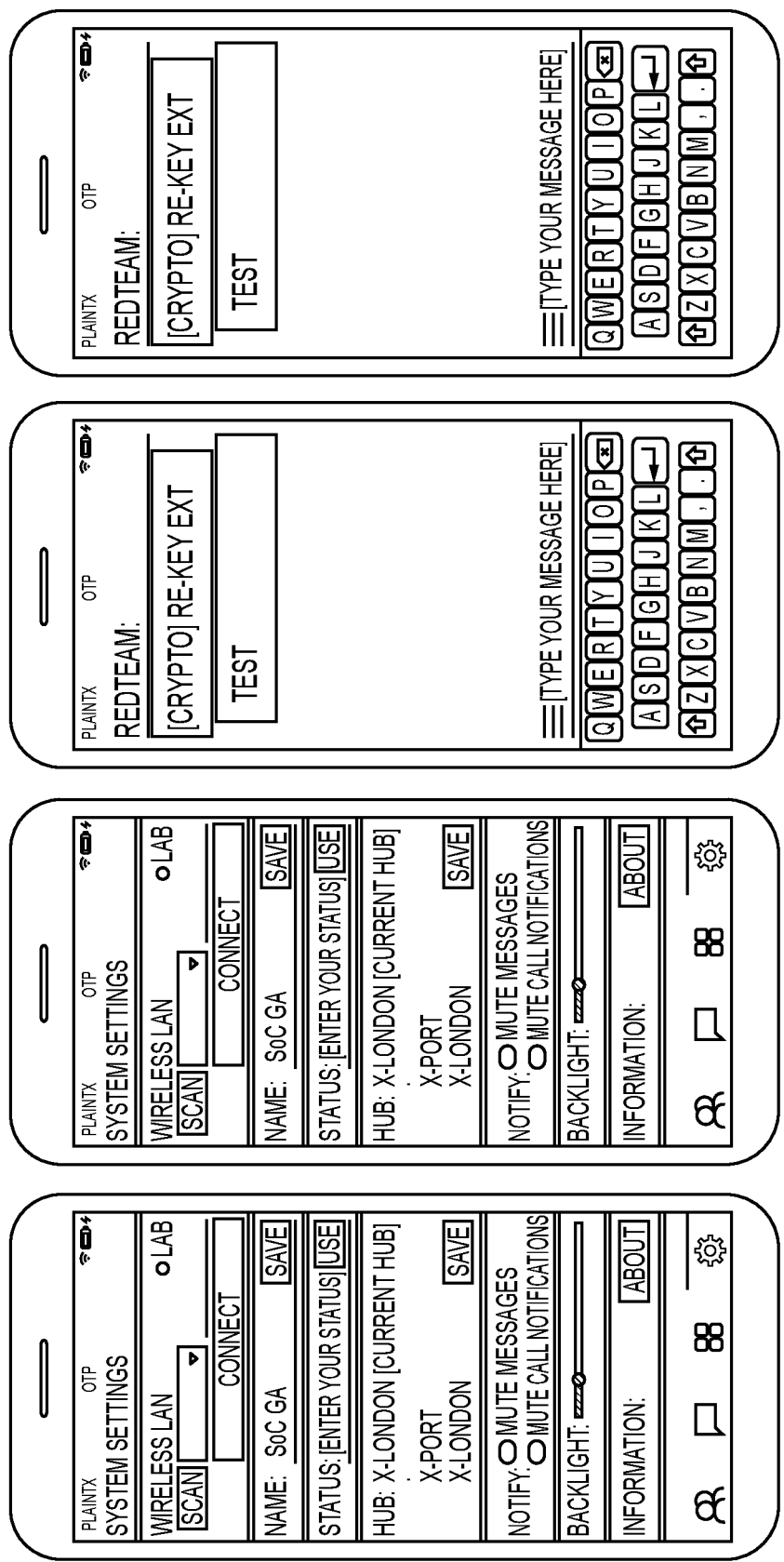

As shown in FIG. 11, MPP can enable the present gateway to interact with cloud storage without exposing or decrypting the subject data in transit. Some of the benefits of MPP are illustrated in FIG. 12. FIG. 13 illustrates details of MPP communications among the parties and the process by which consensus is formed. FIG. 13 also shows differences between MPP and public key infrastructure-based encryption. As shown in FIG. 14, using MPP, the phone or handset shown as having received voice and data communications from the present gateway, demonstrating an operational use of the gateway for MPP-based telecommunication.

In another embodiment, the gateway can be used in combination with MPP to disseminate time and synchronization data to devices authenticated with the gateway. Using MPP, the gateway's time and synchronization data can be disseminated or scattered in a secure, encrypted fashion. Such time and synchronization data can be NTP grade or PTP grade, and it can be transmitted as header or payload data, depending on chosen parameters, such as the level of security desired. In one example, PNT data can be scattered using obfuscation methods discussed elsewhere in this application such that one intercepting a portion or portions of such data will not be able to derive meaningful information without the applicable MPP key needed to decipher such data.

Figure 15:
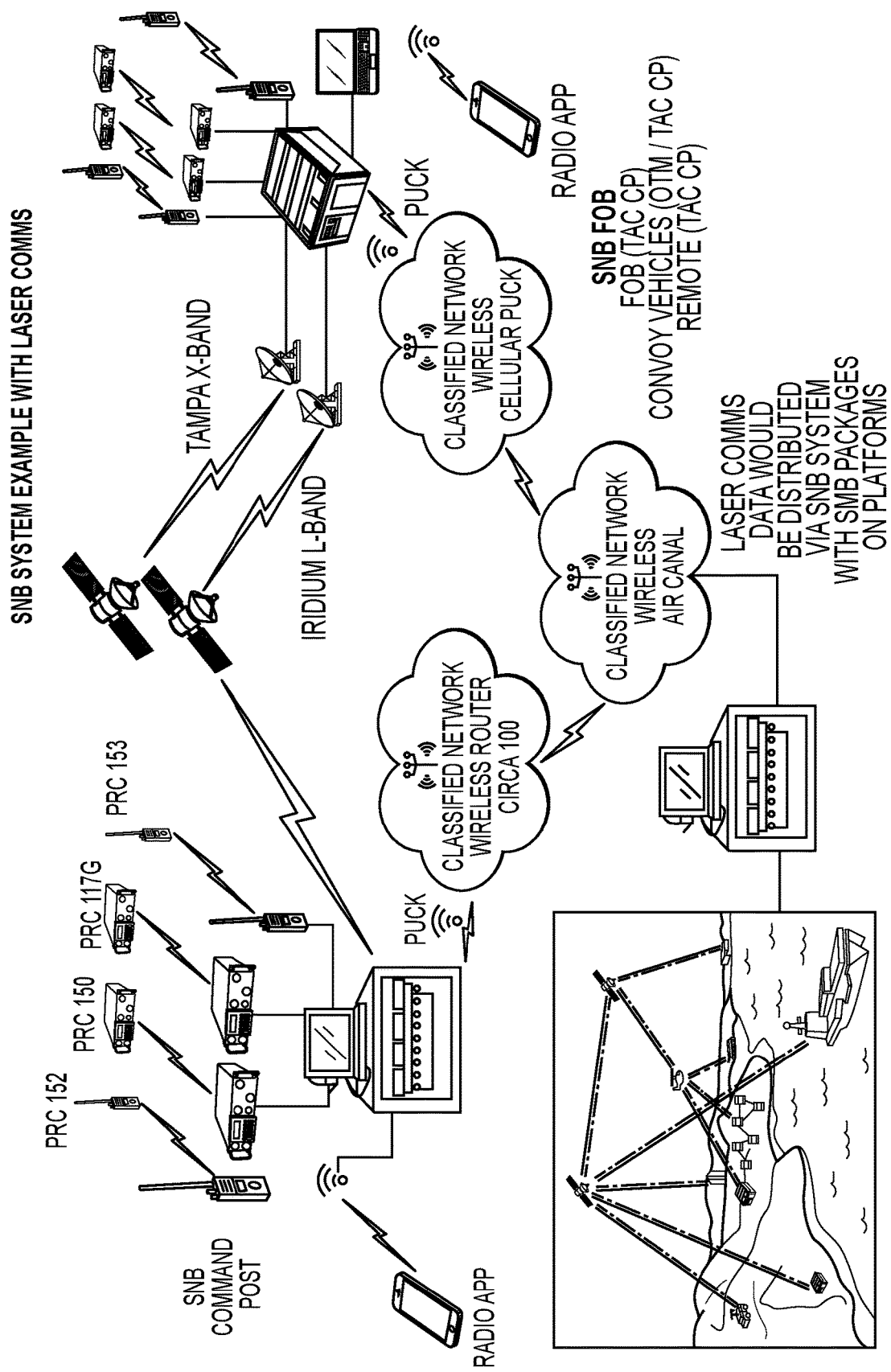
FIG. 15 illustrates the present gateway with connectivities using laser communications.

FIG. 15 illustrates the present gateway as it communicates using lasers. Data may be received and transmitted over any one of the aforementioned sources and additionally communicated using laser communications techniques.

Figure 17:
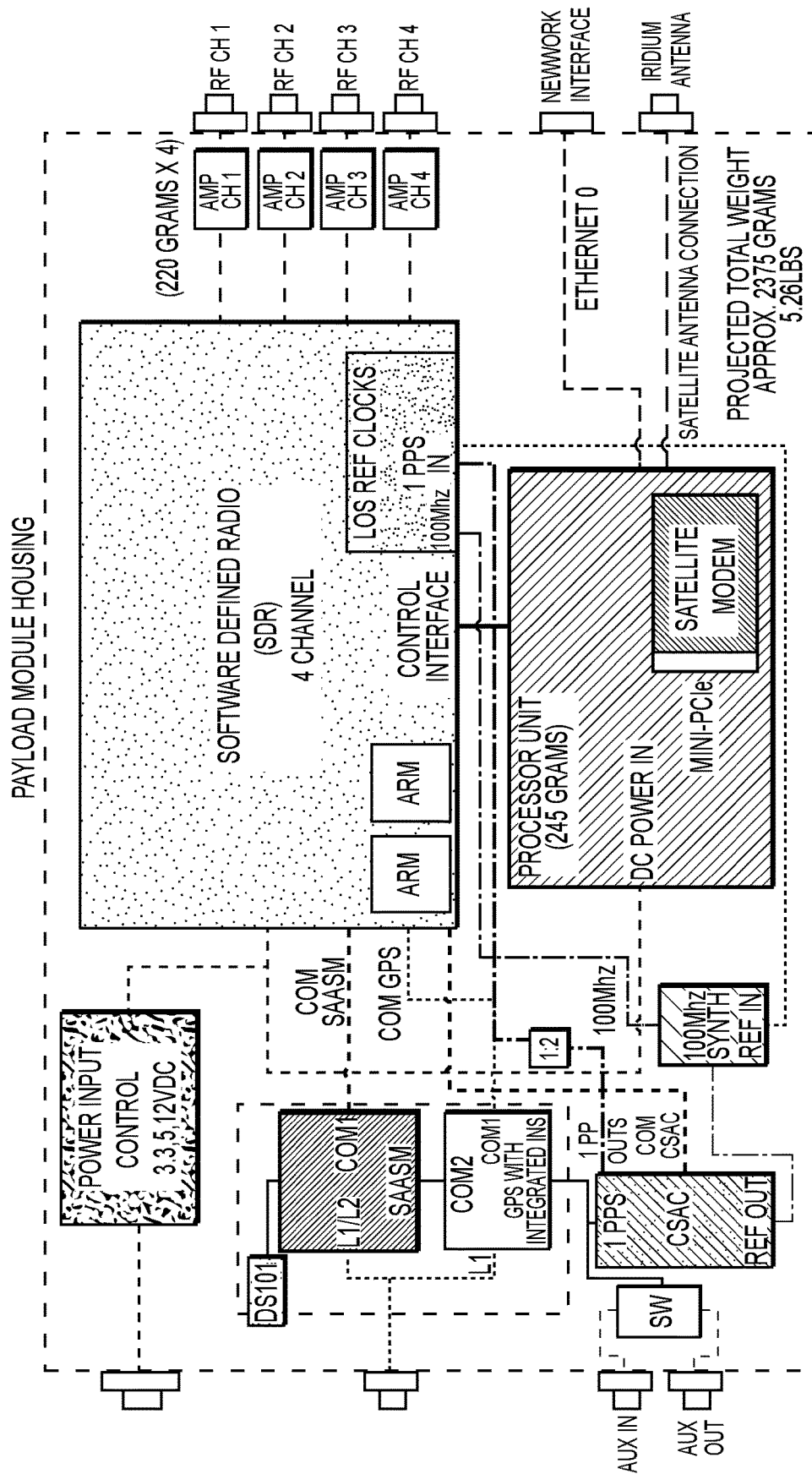
FIG. 17 illustrates one example of a hardware diagram for the present gateway in which components of the gateway are on a circuit board.

In another embodiment, the gateway can be optimized for specific environments. One example is for use in a high-altitude environment that may require that a gateway be hardened for temperature extremes, radiation, high gravitational forces (G forces), or other ambient or environmental factors or constraints. In such an environment, network topology may also allow for networking, whether peer-to-peer, mesh or other, among drones, balloons, or other suitable high altitude vehicles carrying gateways. For such environments, the present gateway may need to be light weight, such as less than or about five pounds in gross weight or meet weight constraints that the military or other users may impose. As shown in FIG. 17, for a wide array of environments or other constraints imposed, the present gateway can be reduced in size and weight such that components discussed throughout this application are available as a circuit board, custom chip, application specific integrated circuit (ASIC), or other form factor in which the gateway's components are reduced in size and weight or miniaturized. As shown in the example hardware diagram in FIG. 17, an SDR is associated with one or more processors, shown here as two Advanced RISC Machines (ARM) processors, as examples only and not intended to limit the present invention. An ARM processor is one of a family of CPUs based on reduced instruction set computer (RISC) architecture and presently implement 32-bit and 64-bit RISC multi-core processors. RISC processors are designed to perform a smaller number of types of computer instructions so that they can operate at a higher speed, performing more millions of instructions per second (MIPS). By reducing instructions and optimizing pathways, RISC processors provide significant performance with less power than complex instruction set computing (CISC) devices. ARM processors are extensively used in consumer electronic devices such as smartphones, tablets, multimedia players and other mobile devices, such as wearables. Because of the reduced instruction set, ARM processors require fewer transistors, which enables a smaller die size for the integrated circuitry (IC). The ARM processor's smaller size, reduced complexity and lower power consumption makes them suitable for increasingly miniaturized devices.

In this example, an SDR with two onboard ARM processors is connected to an SAASM, chipscale clock, and a central processor (CPU) (optionally containing an onboard satellite modem or a separate satellite modem), components needed for various connection pathways for the gateway to employ, including radio outputs and associated channel amplifiers shown on the right side of the Figure, pathways for 5G/4G LTE/3G and customized waveform communication, ethernet communication, and others), a chip scale atomic clock (CSAC, such as a Microsemi SA.45s)), and appropriate power source and control components. By reducing the size and weight of the present gateway's components to board or chip scale, a wide variety of form factors and use cases can be addressed, including allowing the gateway to be more easily wearable or carriable by a user, including being embedded in clothing, a bag or backpack, or other appropriate form factor. Various embodiments of the present gateway can also be combined with a thermal or other self-destruction device, through which the gateway would render itself unusable under certain circumstances, such as interception or acquisition by an adverse party.

In another example, the present gateway can employ cellular communication (5G/4G LTE/3G or other suitable present or future protocol) as a carrier with a modified protocol stack to allow for the use of MPP or other blockchain-based protocol. 5G enables enhanced mobile broadband (eMBB), ultra-reliable and low latency communications (URLLC), and massive machine-type communications (mMTC). These use cases are defined by ITU-R (ITU Radiocommunication Sector (ITU-R)). In this embodiment of the present invention, the 5G physical layer can be preserved such that those aspects of the 5G protocol stack needed to establish and maintain communication are preserved, and the other portions of the stack, such as the IP packet core, are replaced with MPP or other suitable blockchain-based evolved packet core protocol. In this embodiment, the gateway will be able to communicate in a manner compatible with 5G bi-directional amplifiers (BDAs) and appear like an ordinary 5G signal on a spectrum analyzer or other suitable analytical device. Yet, the payload carried on the 5G carrier will be encrypted and secured using MPP or other suitable blockchain-based protocol and thus be indecipherable to any party not using the present gateway with appropriate decryption keys.

Thus, the present gateway solves problems in conventional systems and provides configurable hardware and software that allows the gateway to receive audio, video, control or other data streams from many different sources, protocols, physical spectrums, or communications technologies, extract a payload, convert the payload to one or more formats for outgoing wide area network (WAN) output to a wide array of destinations, protocols, physical spectrums, or communications technologies. The gateway can also be configured with an array of encryption technologies, software defined radios, transmission obfuscation techniques, self-healing techniques, block chain-based security (using, e.g., a multi-party protocol), or failsafe synchronization technologies that provide precise position, navigation, or timing (PNT) information in the absence of GPS or other common sources of such information.

What is claimed:

1. A miniaturized communications gateway, comprising:
    a power controller that provides a plurality of output voltages to components within the gateway;
    a Selective Availability Anti-Spoofing Module (SAASM)-based GPS receiver that receives and authenticates GPS signals and provides timing information to a chip-scale atomic clock (CSAC);
    a network interface that receives network-based communication;
    a satellite antenna input;
    a software defined radio (SDR) that establishes bi-directional communications using a plurality of different protocols, different radio frequency (RF) bands, different spectrums, and different physical layer communication technologies, the SDR providing output RF signals to at least one amplifier associated with a respective RF output; and
    a processor that performs signal processing associated with the SDR,
    wherein if the timing information provided by the GPS receiver does not conform with a predetermined standard, the CSAC disconnects from the GPS receiver and independently maintains and provides the timing information to devices authenticated with the miniaturized communications gateway.

2. The miniaturized communications gateway of claim 1, further comprising a satellite MODEM.

3. The miniaturized communications gateway of claim 1, wherein the plurality of different protocols, different radio frequency (RF) bands, different spectrums, and different physical layer communication technologies comprise any one of TCP/IP, SIPR, NIPR, 3G, 4G, 4G LTE, 5G, wireless RF, high frequency (HF), very low frequency (VLF), very high frequency (VHF), ultra-high frequency (UHF), serial, Ethernet, fiberoptic, and optical laser.

4. The miniaturized communications gateway of claim 1, wherein the components therein are provided on a circuit board.

5. The miniaturized communications gateway of claim 1, wherein the components therein are provided as a custom chip.

6. The miniaturized communications gateway of claim 1, wherein the components therein are provided as an application specific integrated circuit (ASIC).

7. The miniaturized communications gateway of claim 1, wherein the components therein are hardened in accordance with predetermined environmental or operational conditions to meet at least one of the following standards: DO-160G Section 10, MIL-STD-810H environmental durability requirements, MIL-STD-461G, and IP67.

8. The miniaturized communications gateway of claim 1, wherein the processor is an Advanced RISC Machines (ARM) processor.

9. The miniaturized communication gateway of claim 1, wherein the SDR is adapted to transform the received communications from any of the plurality of different protocols, different RF bands, different spectrums and different physical layer communication technologies to any of the plurality of different protocols, different RF bands, different spectrums and different physical layer communication technologies.

10. The miniaturized communication gateway of claim 9, wherein at least one of the plurality of different protocols comprises a cryptographic protocol that distributes a computation across multiple parties such that no individual party can see the other parties' data.

11. The miniaturized communication gateway of claim 1, wherein the chip-scale atomic clock synchronizes an atomic clock in accordance with timing information included with incoming GPS signals received by the SAASM-based GPS receiver.

12. The miniaturized communication gateway of claim 11, wherein timing and synchronization data provided by the atomic clock is synchronized with devices that authenticate with the miniaturized communication gateway.

13. The miniaturized communication gateway of claim 11, wherein the chip-scale atomic clock operates as a master timing source on SADR communication paths.

14. The miniaturized communication gateway of claim 1, wherein the miniaturized communication gateway is a source of Assured Position, Navigation and Timing (PNT) information using the PTP protocol.

15. A communications gateway, comprising:
- a software defined radio (SDR) associated with one or more processors;
- a Selective Availability Anti-Spoofing Module (SAASM)-based GPS receiver;
- a chip-scale atomic clock (CSAC);
- a plurality of radio frequency (RF) inputs;
- a plurality of RF outputs;
- a central processor that controls the communications gateway; and
- a power input controller that distributes power to components within the communications gateway,
- wherein the SDR is adapted to transform communications over the plurality of RF inputs from any of the plurality of different protocols, different RF bands, different spectrums and different physical layer communication technologies to any of the plurality of different protocols, different RF bands, different spectrums and different physical layer communication technologies for output over the plurality of RF outputs, and
- wherein if timing information provided by the GPS receiver does not conform with a predetermined standard, the CSAC disconnects from the GPS receiver and independently maintains and provides the timing information to devices authenticated with the communications gateway.

16. The communications gateway of claim 15, wherein the one or more processors are based on reduced instruction set computer (RISC) architecture having multiple cores.

17. The communications gateway of claim 15, wherein the plurality of different protocols, different radio frequency (RF) bands, different spectrums, and different physical layer communication technologies comprise any one of TCP/IP, SIPR, NIPR, 3G, 4G, 4G LTE, 5G, wireless RF, high frequency (HF), very low frequency (VLF), very high frequency (VHF), ultra-high frequency (UHF), serial, Ethernet, fiberoptic, and optical laser.

18. The communications gateway of claim 15, wherein the communications gateway is adapted to be wearable or carriable by a user.

19. The communications gateway of claim 15, wherein the central processor includes a satellite MODEM.

20. The communications gateway of claim 15, wherein the CSAC synchronizes an atomic clock in accordance with timing information included with incoming GPS signals received by the SAASM-based GPS receiver.

* * * * *